Aug. 16, 1966  G. A. COOLEY ET AL  3,266,581
VIBRATIONLESS POWER TOOL

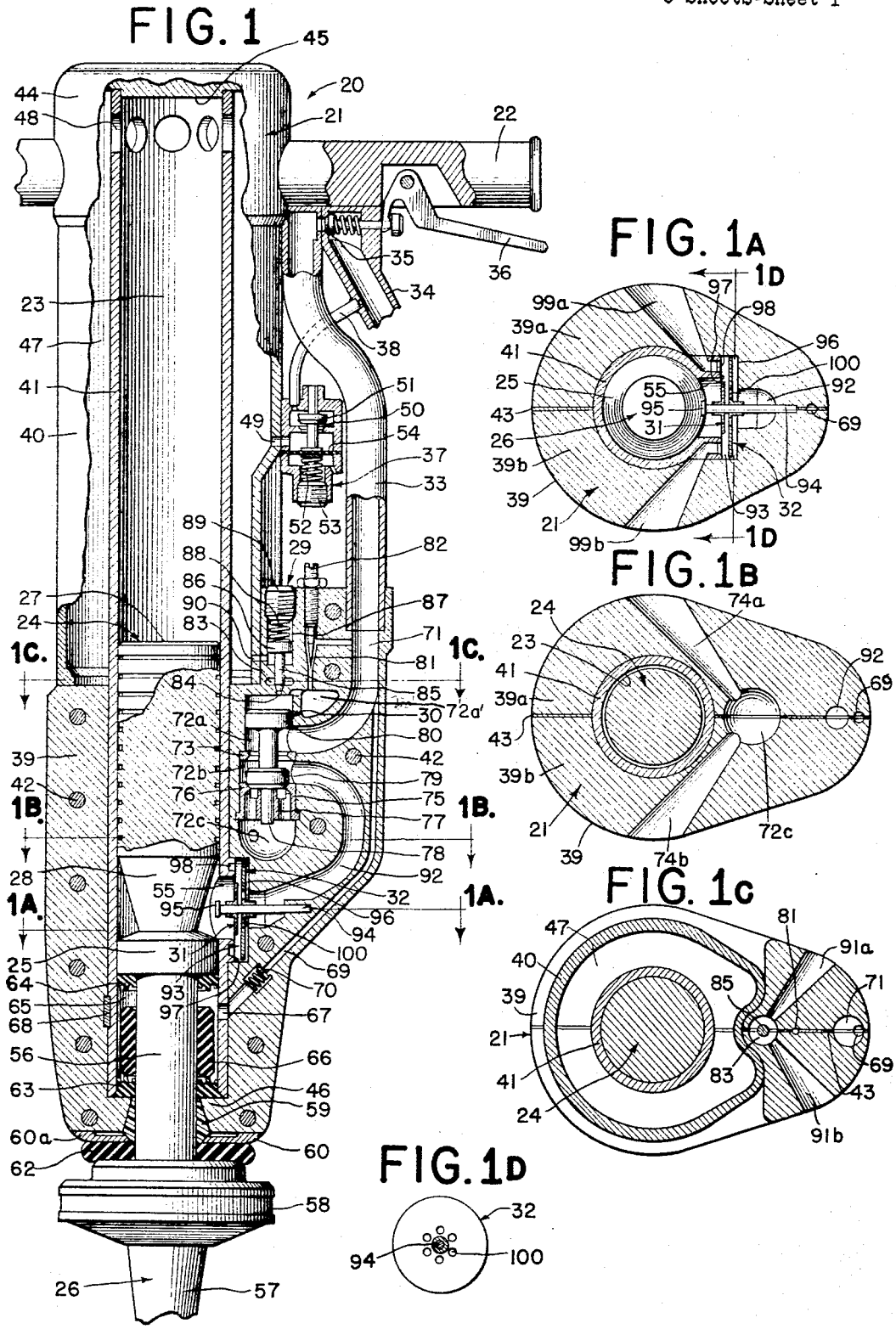
Aug. 16, 1966     G. A. COOLEY ET AL     3,266,581
VIBRATIONLESS POWER TOOL
Filed Nov. 1, 1963     9 Sheets-Sheet 1

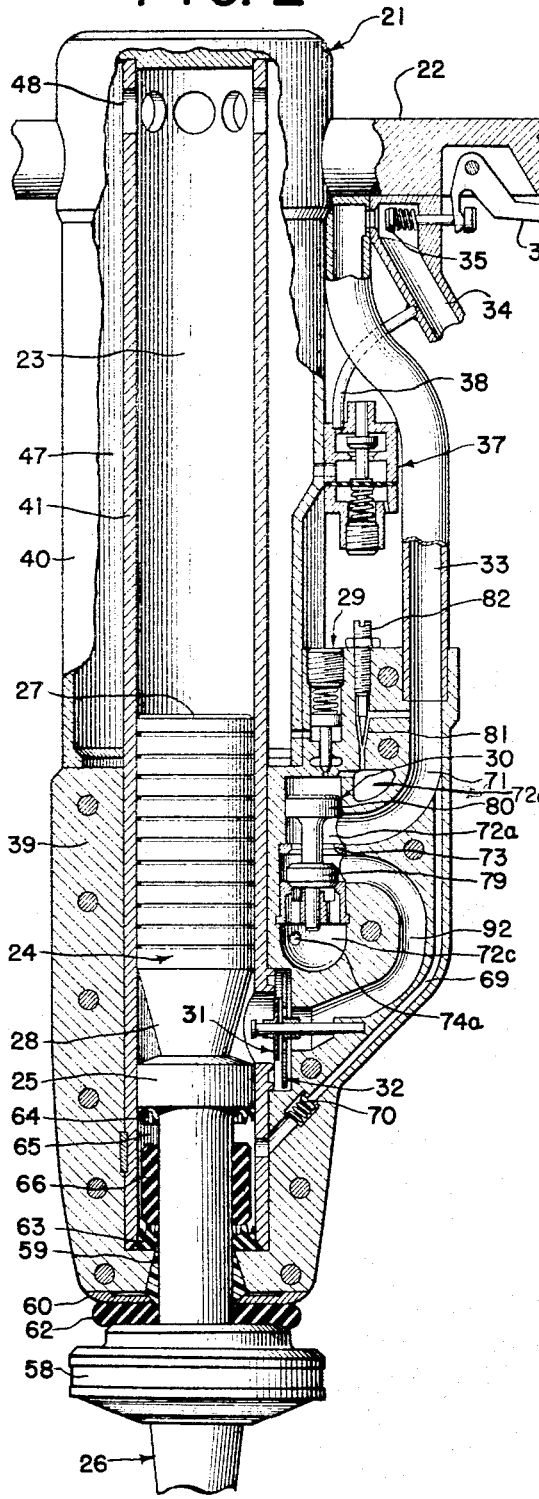
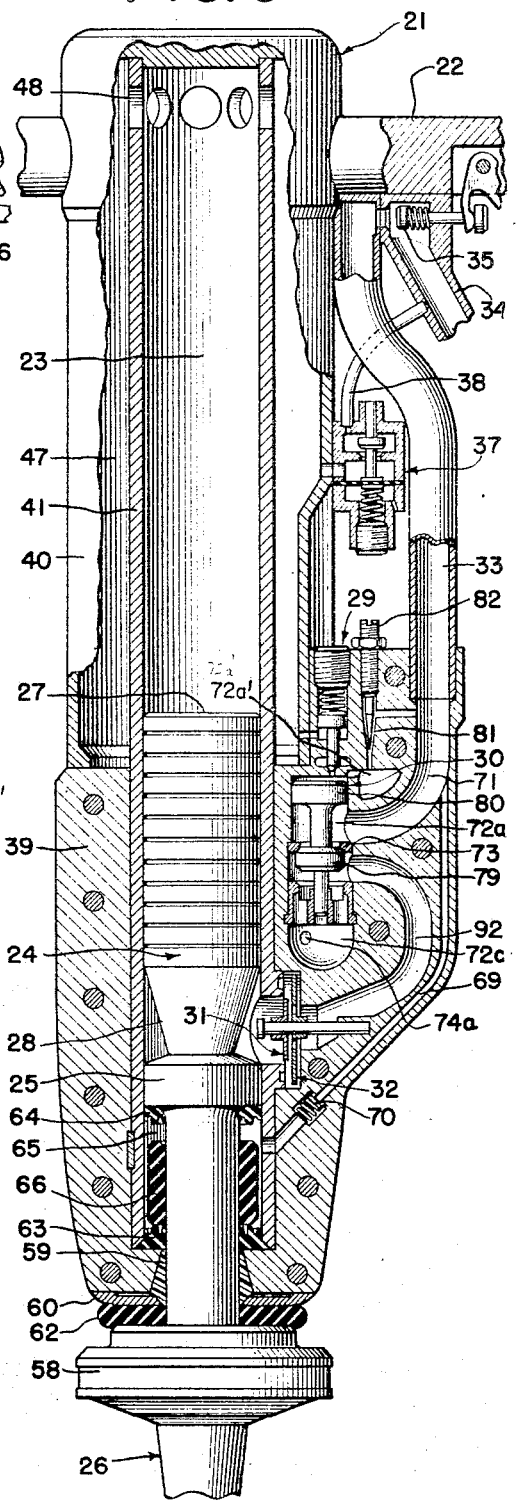

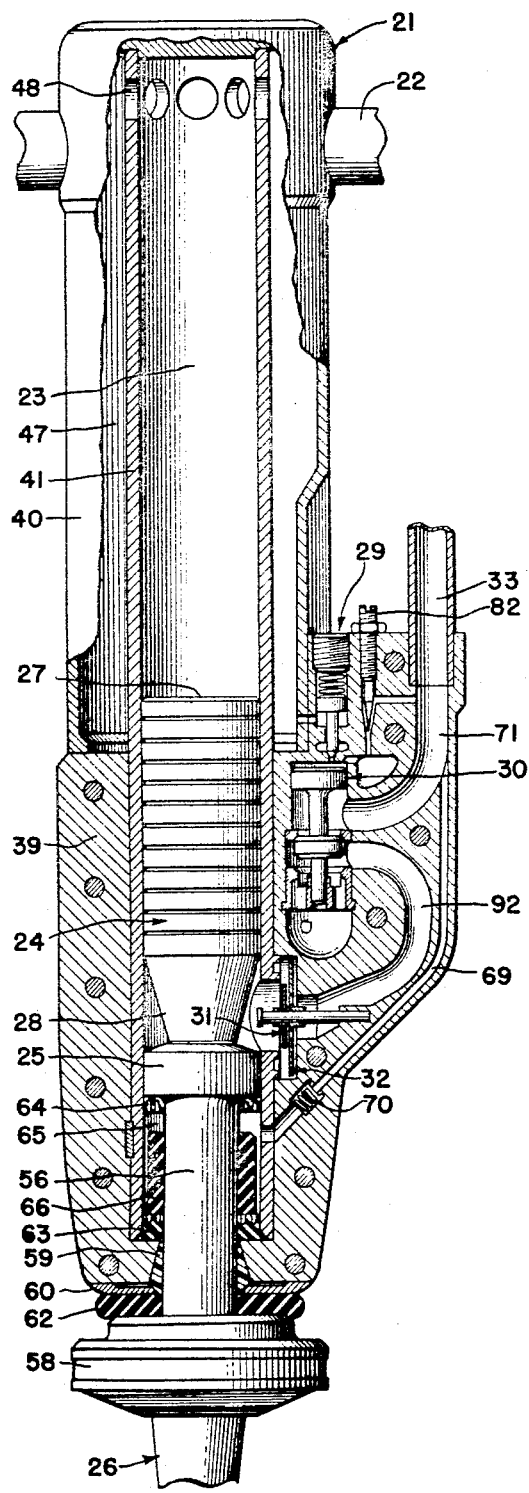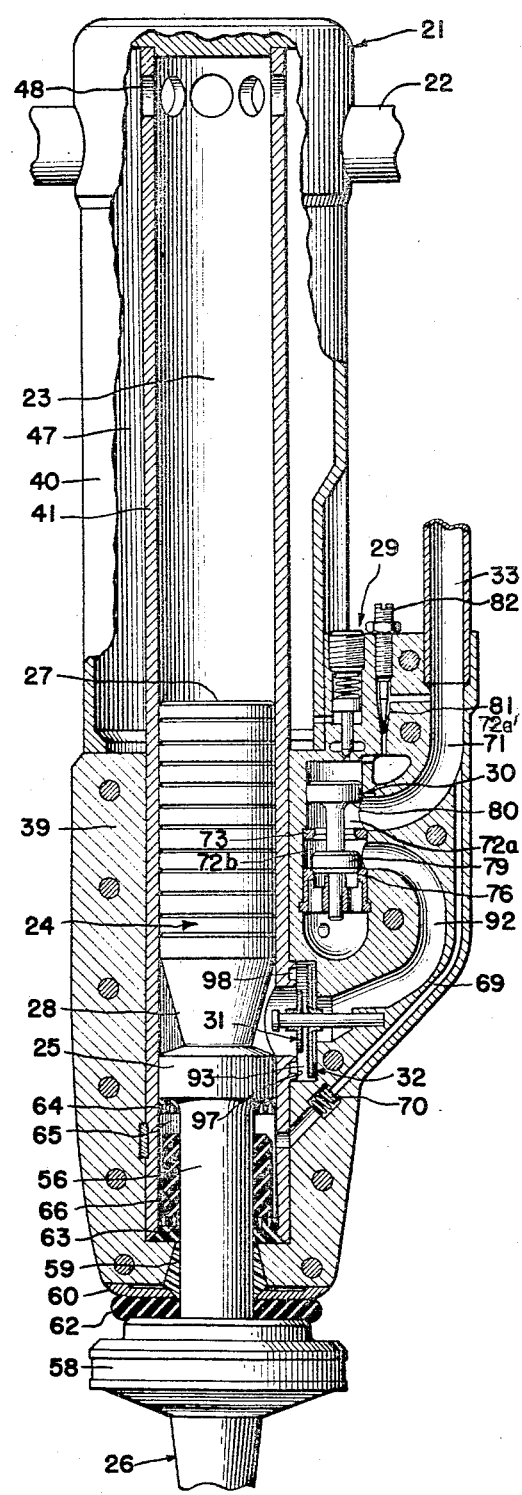

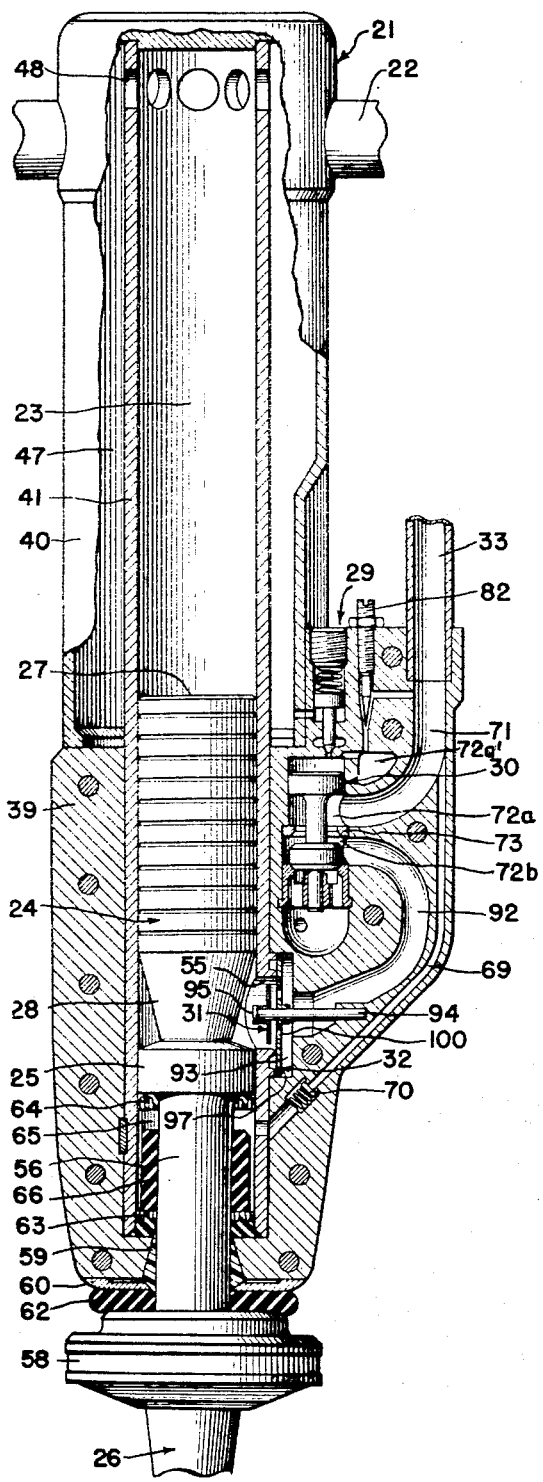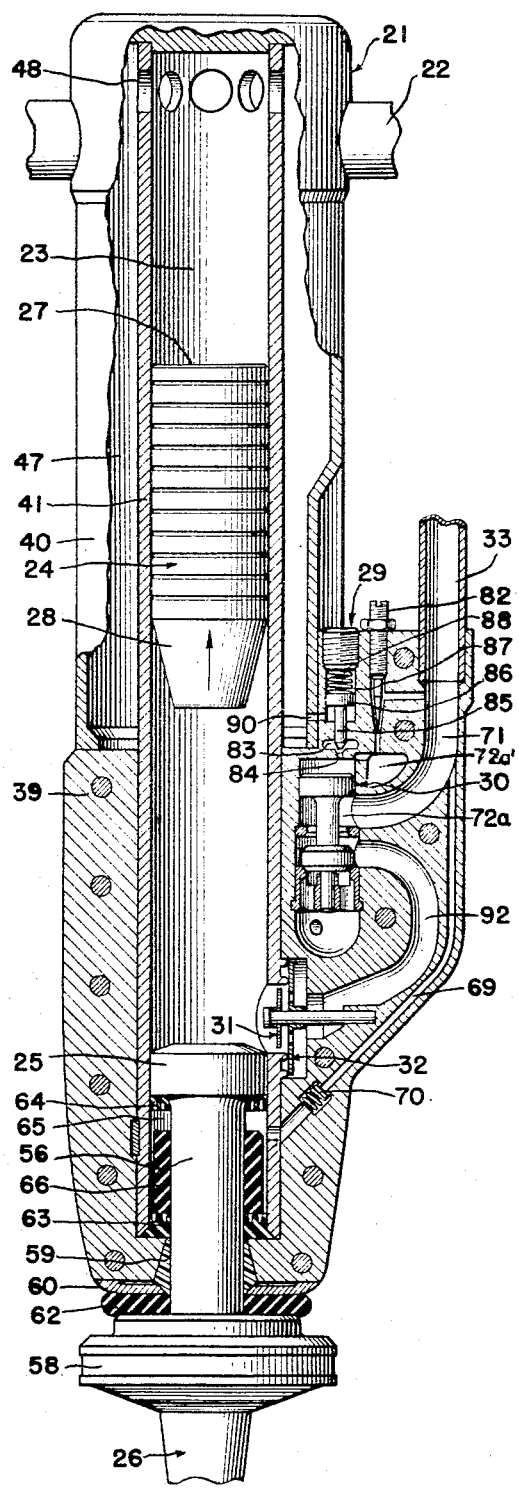

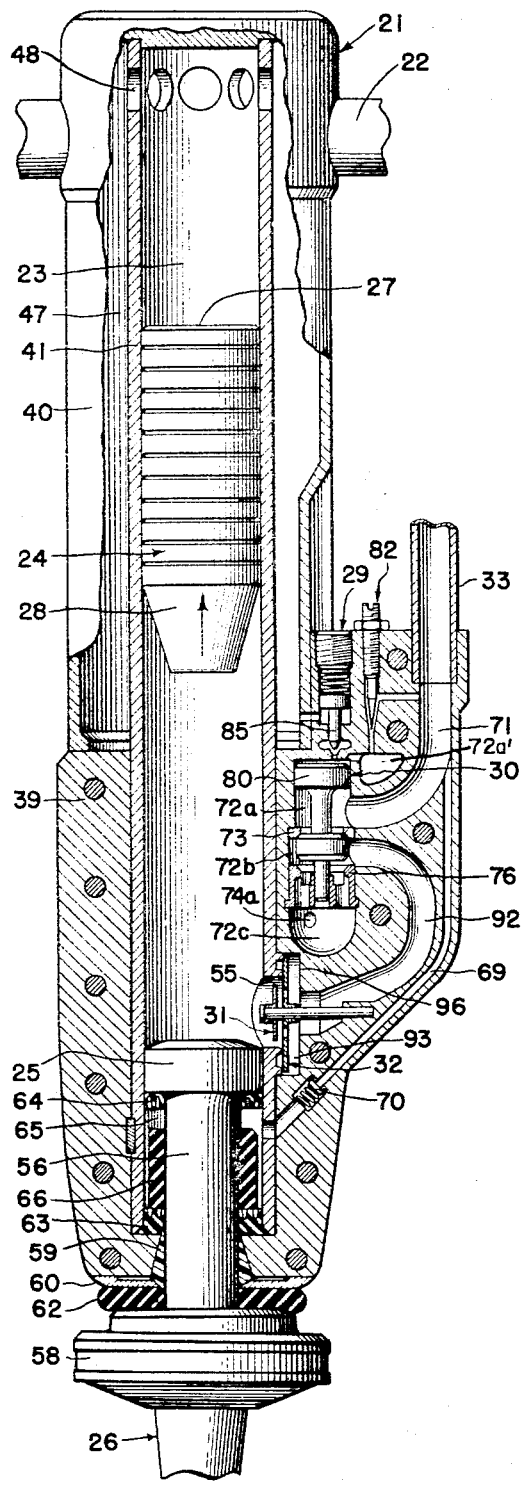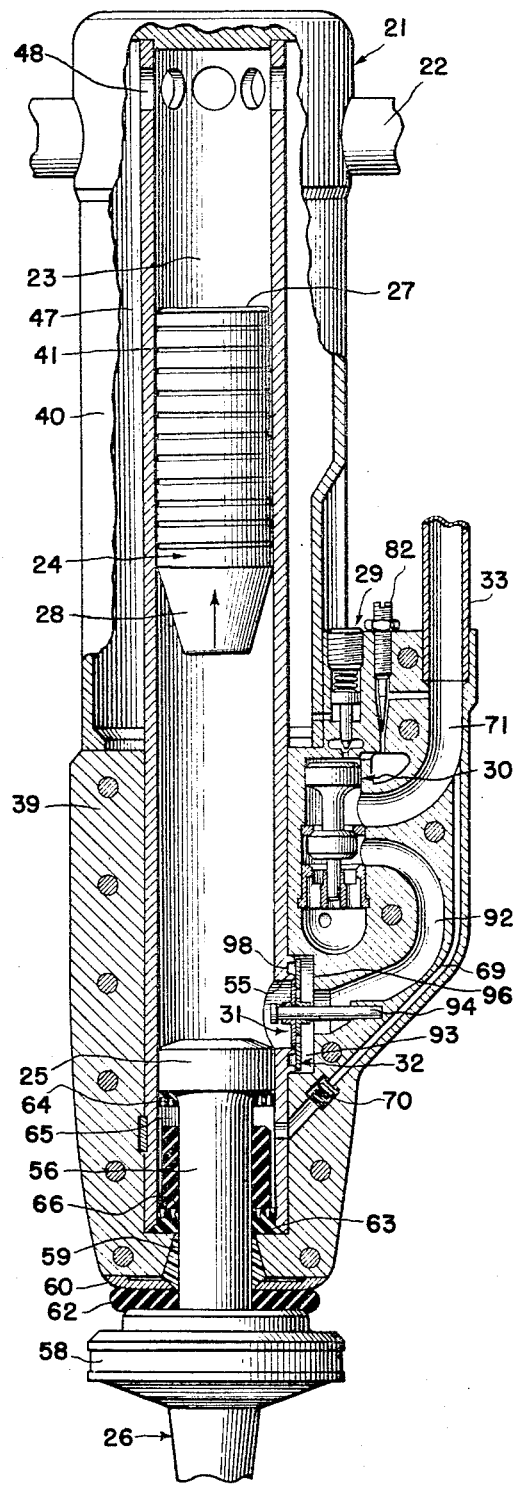

Filed Nov. 1, 1963  9 Sheets-Sheet 8

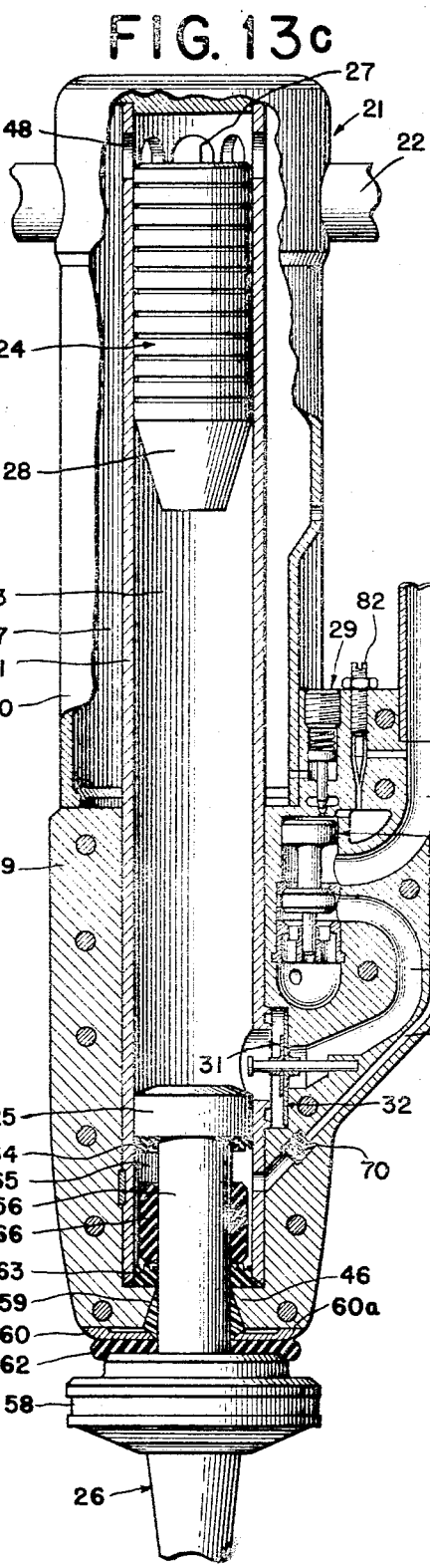

United States Patent Office 3,266,581
Patented August 16, 1966

3,266,581
VIBRATIONLESS POWER TOOL
Gordon A. Cooley, Chicago, and Charles Leavell, Lombard, Ill.; said Cooley assignor to Mechanical Research Corporation, Chicago, Ill., a corporation of Illinois
Filed Nov. 1, 1963, Ser. No. 320,635
54 Claims. (Cl. 173—162)

This invention relates to power tools of the class commonly known as percussive tools—for example, paving breakers, rock drills, riveters and the like; and is particularly exemplified by a vibrationless pneumatically actuated percussive tool.

Considering a pneumatic paving breaker as illustrative of percussive tools in which the invention has utility, the structural assembly thereof includes a casing defining an axially extending cylinder therein, a hammer or blow-striking piston reciprocable within the cylinder, and a steel spike or work member slidably carried by the casing for limited axial movements with respect thereto which is adapted to receive impact from the hammer (usually through an anvil or tappet interposed therebetween) at one end of the reciprocatory stroke thereof. The impact transmitted from the hammer to the spike is delivered thereby to a concrete slab or other work material to break or demolish the same—the hammer being reciprocated within its cylinder by the alternate application of compressed air to the opposite ends thereof.

In the usual paving breaker, the charges of compressed air alternately admitted into the opposite ends of the cylinder to respectively reciprocate the hammer in directions toward and away from the spike are each reactively applied against transverse surfaces defining the end closures of the cylinder, and as a consequence thereof, the casing is moved or vibrated in opposite directions along the axis of reciprocation of the hammer. In many tool structures, the hammer is reciprocated at a frequency approximating 1,200 cycles per minute; and therefore, the pressure forces reacting alternately against the opposite end closures of the cylinder introduce a relatively high frequency, violent and objectionable vibration into the casing. Generalizing such structural composition, the usual paving breaker may be said to be a tripartite vibratile structure comprising a "desirably or unavoidably vibrating body" in the form of a reciprocable hammer, a "body in which the occurrence of vibration is objectionable" in the form of a handle-equipped casing, and "connecting structure or linkage" in the form of gaseous columns force-connecting the casing structure and hammer for accomplishing a necessary transmission of force therebetween.

In Leavell and Wheeler Patent No. 2,400,650, there is disclosed a constant-force linkage for accomplishing a necessary transmission of force between a "desirably or unavoidably vibrating body" and a "body in which the occurrence of vibration is objectionable" without transmitting vibration therebetween; and such linkage is of pneumatic type made operative by the maintenance of constant pressure values and illustratively applied between ordinary vibrating paving breakers and outer handle-bearing casings therefor to provide externally vibrationless concrete-breaking tools for hand-held use. In the specific structure of such two-casing percussive tool, the inner tool casing which contains the reciprocable hammer (and which is caused to vibrate as a consequence of the charges of pressure fluid alternately applied to opposite ends of the hammer to energize the reciprocatory cycle thereof) is the "desirably or unavoidably vibrating body," the outer handle-bearing casing is the "body in which the occurrence of vibration is objectionable," and such two bodies are force-connected by the force-transmitting linkage which is incapable of transmitting vibration between the two bodies because of the single-valued or constant character of the force transmitted thereby.

In Leavell Patent No. 2,679,826, there is disclosed a one-casing pneumatically actuated percussive tool having a handle-equipped casing defining an axially extending cylinder provided with a hammer-piston reciprocable therein, and the handle-equipped casing remains vibrationless during operation of the tool because it is force-connected to the reciprocable hammer by a constant-force linkage of the aforementioned type. In this tool, the constant-valued force provided by such linkage is continuously applied to one end of the hammer to urge it in the direction toward impact with the spike and anvil structure, and the hammer is cyclically reciprocated in the opposite direction against such constant force by the intermittent application to the opposite end of the hammer of a force of superior value—such intermittent force being reactivity applied to the ground through the spike and anvil structure, rather than to the handle-equipped casing.

In Leavell Patent No. 3,028,841, there is disclosed a constant-force linkage for transmitting a necessary force between a desirably or unavoidably vibrating body and a second body in which the occurrence of vibration is objectionable without transmitting vibration therebetween, and such linkage is operative in association with an automatic control system for regulatively adjusting the value of the transmitted force for the purpose of maintaining the two bodies in a predetermined operational relation.

A force-transmitting linkage of the type described in each of the aforementioned patents is incapable of transmitting vibration between the vibratory body and the body in which the occurrence of vibration is undesirable because only a force of variable value applied to a body can cause it to vibrate, and the described linkage does not transmit forces of such character. In practical terms, the more perfect the constancy in value of the force transmitted by such a connecting linkage, the more perfect is the vibration-isolating function thereof. Conversely, as the value of the force progressively departs from constancy, any vibration transmitted by the linkage becomes progressively greater.

The force-transmitting linkages specifically disclosed in the aforesaid patents are of pneumatic type; and each includes a large pressurized space comprising a pneumatic column that defines the force connection between the aforementioned two bodies. In each instance, the volume of such space is sufficiently large relative to the changes therein caused by the displacements of the vibratory body that substantially no change in pressure occurs within such space as a consequence of the displacements.

In each of these prior patents, it has been indicated that the degree of constancy in the value of the pressure in the linkage can be made as nearly perfect as desired simply by increasing the total volume of the "constant pressure space" (the large pressurized space and any other spaces in open communication therewith) relative to the changes therein caused by the displacements of the vibratory body until substantially no pressure change occurs as a result of such displacements, and it has also been indicated that the degree of constancy ordinarily required is only that which obviates the transmission of sensible vibrations between the vibratory body and the body in which the occurrence of vibration is undesirable. That is to say, in any practical tool structure, vibration elimination may be considered to be acceptably perfect when the tool operator is unable to detect or sense disturbing vibrations in the handle-equipped casing structure; and it has been found that this result is generally attained well before the value of the force transmitted by the linkage is regulated to perfect constancy. Therefore, the term "substantially constant force" has been employed in the aforesaid patent disclosures and will again be employed herein to include force values that may undergo a degree of variation but which are sufficiently constant to provide the desired condition of sensibly vibrationless performance of the tool. Correspondingly, the term "constant-force linkage" is used to refer to any variable-length linkage specialized for the transmission of such substantially constant force.

The present invention has for an object the useful employment of variations from perfect constancy in the value of the force transmitted by such constant-force linkage between a desirably or unavoidably vibrating body and a body in which the occurrence of vibration is objectionable.

Another object of the invention is to provide in a tripartite vibratile structure comprising a vibratory body, a body in which the occurrence of vibration is objectionable, and a constant-force linkage interconnecting the same, control apparatus responsive to variations from absolute constancy in the value of the force transmitted by such linkage to govern the energization of the vibratory motion of the vibratory body.

Yet another object is in the provision of a percussive tool having a casing defining a cylinder therein, a hammer or piston reciprocable within such cylinder for the successive intermittent delivery of impact force to a spike or work member slidably carried by the casing, a substantially constant pressure force continuously acting between the casing and the hammer to energize the blow-stroke thereof and a control system responsive to variations from constancy in such pressure force for cyclically admitting charges of compressed air into the cylinder to energize the back-stroke of the hammer.

A further object is to provide a percussive tool of the character described in which means are included for extending the range of the permitted variation from absolute constancy in the continuously operative pressure force delivered through such force-transmitting linkage and energizing the blow-stroke of the hammer without introducing sensible vibration into the casing, with the result that the aforementioned control system may have less critical pressure-response characteristics than would otherwise be the case.

Yet a further object is that of providing a pneumatically actuated vibrationless percussive tool having the characteristics described, and in which friction means operative between the casing and work member permit and accommodate such greater variations from that degree of constancy which would otherwise be required to be provided by the force-transmitting linkage to eliminate the transmission of sensible vibration from the reciprocable hammer-piston to the casing, and also in which the value of such substantially constant force transmitted by the linkage increases during the return stroke of the piston and decreases during the downstroke thereof—the control system comprising valve structure responsive to such variations from constancy to control the admission of compressed air charges into the casing cylinder to cyclically and repetitively energize the backstroke of the piston and to alternately exhaust such charges during the blow-stroke of the piston.

Still a further object is in the provision of adjustment means in association with such control valve system for selectively varying the frequency of the reciprocatory cycle of the hammer-piston and also for selectively adjusting the range of the reciprocatory displacement of the hammer-piston to alter the magnitude of the blow delivered thereby to a work member.

Yet a further object is to provide means for automatically applying a feeding force to the casing of such tool to supplement the downwardly active gravitational feeding force (when applicable) and the downpush or manual feeding force applied to the casing by the operator of the tool and, in some cases, to materially decrease the requirement for such manually applied feeding force.

Still another object is that of providing a regulative compensation system in association with the casing and work member of such percussive tool to adjustably accommodate variations in the magnitude of the manual feeding force or downpush externally applied to the tool casing which could otherwise destroy the maintenance of the optimum operating position of the tool casing with respect to the work member.

Additional objects and advantages of the invention will become apparent as the specification develops.

*The drawings*

An embodiment of the invention is illustrated in the accompanying drawings, in which—

FIGURE 1 is essentially a broken vertical sectional view of a pneumatically actuated paving breaker embodying the invention, the tool being illustrated in a dormant operational state but being connected to a source of pressure fluid;

FIGURES 1A, 1B and 1C are transverse sectional views, respectively taken along the lines 1A—1A, 1B—1B, and 1C—1C of FIGURE 1;

FIGURE 1D is essentially a face view in elevation of the exhaust valve, the view being taken generally along the line 1D—1D of FIGURE 1A;

FIGURES 2 through 13 are respectively longitudinal sectional views similar to that of FIGURE 1 but illustrating the tool in successive states or phases of an operational cycle; and in particular FIGURE 2 shows the tool as the manually controlled main or line valve is opened;

FIGURE 3 shows the tool immediately after the main valve is open, the inlet valve having been closed as a consequence of this action;

FIGURE 4 shows the tool just subsequent to such closing of the inlet valve, the check valve leading to the space below the spike head being open and such space being over-pressurized;

FIGURE 5 illustrates the tool at a slightly later stage in which the inlet valve has been returned to its open position and the check valve to its closed position, wherefore FIGURE 5 corresponds essentially to FIGURE 2;

FIGURE 6 illustrates the tool at a still later time at which the exhaust valve and exhaust pilot valve are both in the admittance position thereof;

FIGURE 7 illustrates the tool at a still later stage in which the inlet pilot valve is open and the piston or hammer is being reciprocated through its return stroke because of the charge of pressure fluid acting upwardly thereagainst;

FIGURE 8 depicts a still later phase in which the hammer is still traveling through its return stroke, and in which the inlet pilot valve is still open but the inlet valve has been closed;

FIGURE 9 depicts yet a later phase wherein the hammer continues to travel upwardly, the inlet valve remains open, the inlet valve remains closed, and the exhaust pilot valve is closed, but the overpressure valve is open;

FIGURE 10 shows a subsequent state in which the hammer continues its upward travel, the inlet pilot valve remains open, the inlet valve remains closed, and both the exhaust pilot valve and exhaust valve are open—that is, in the exhaust position thereof;

Figure 10:
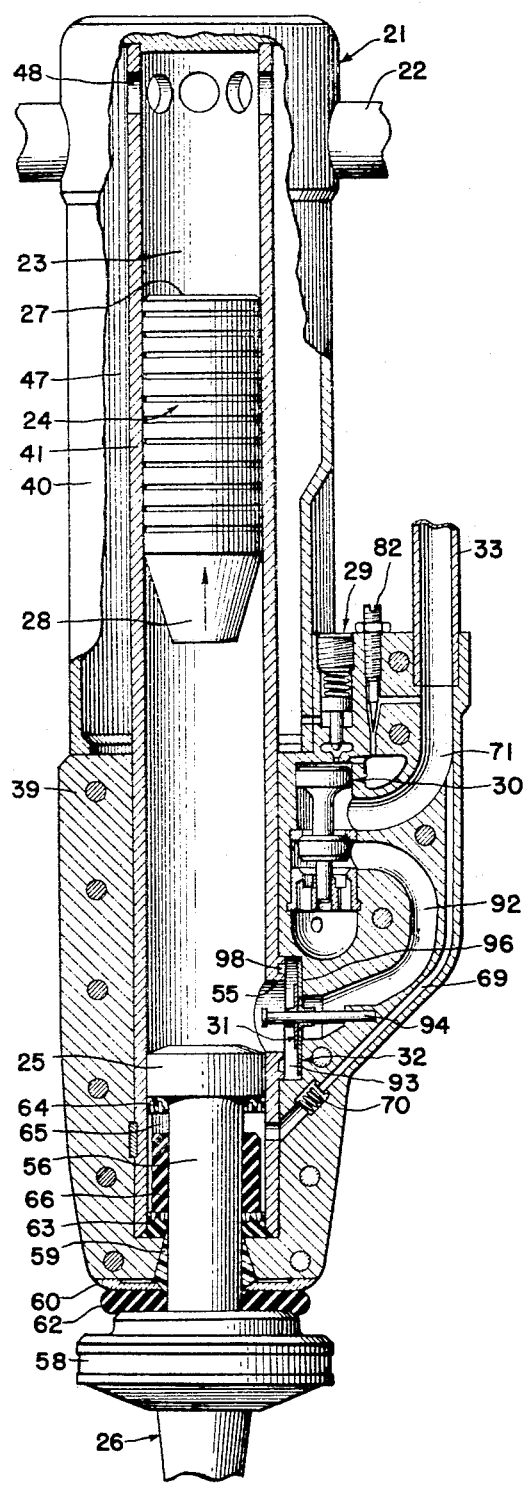
Figure 11:
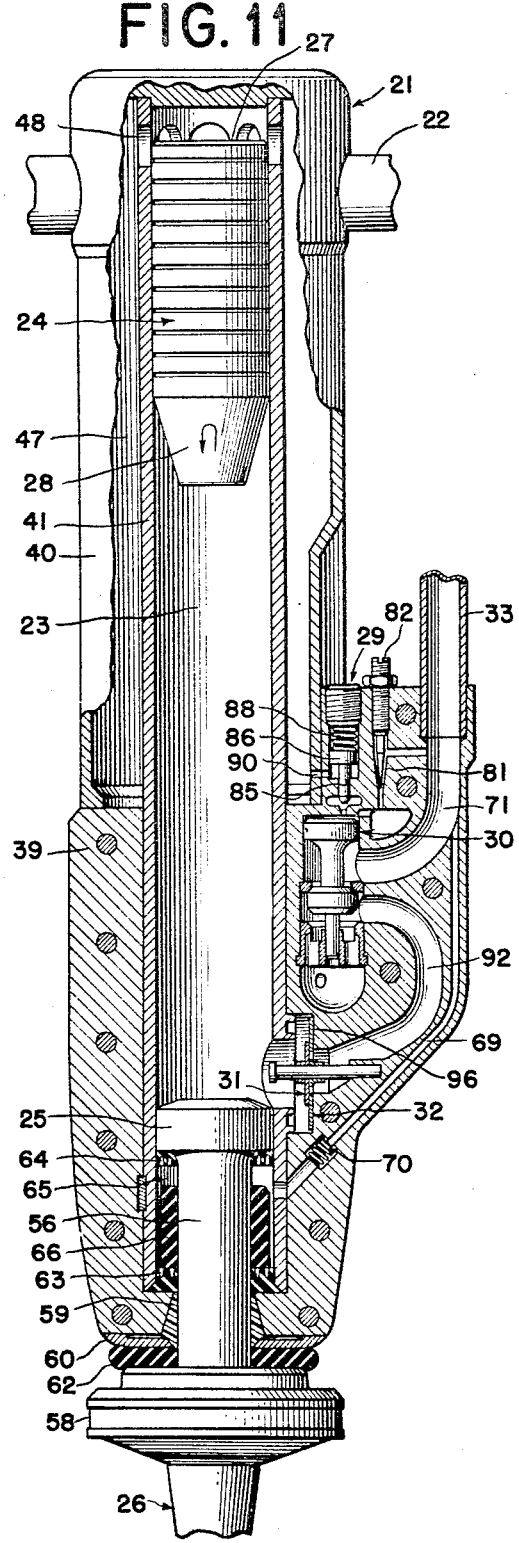
Figure 12:
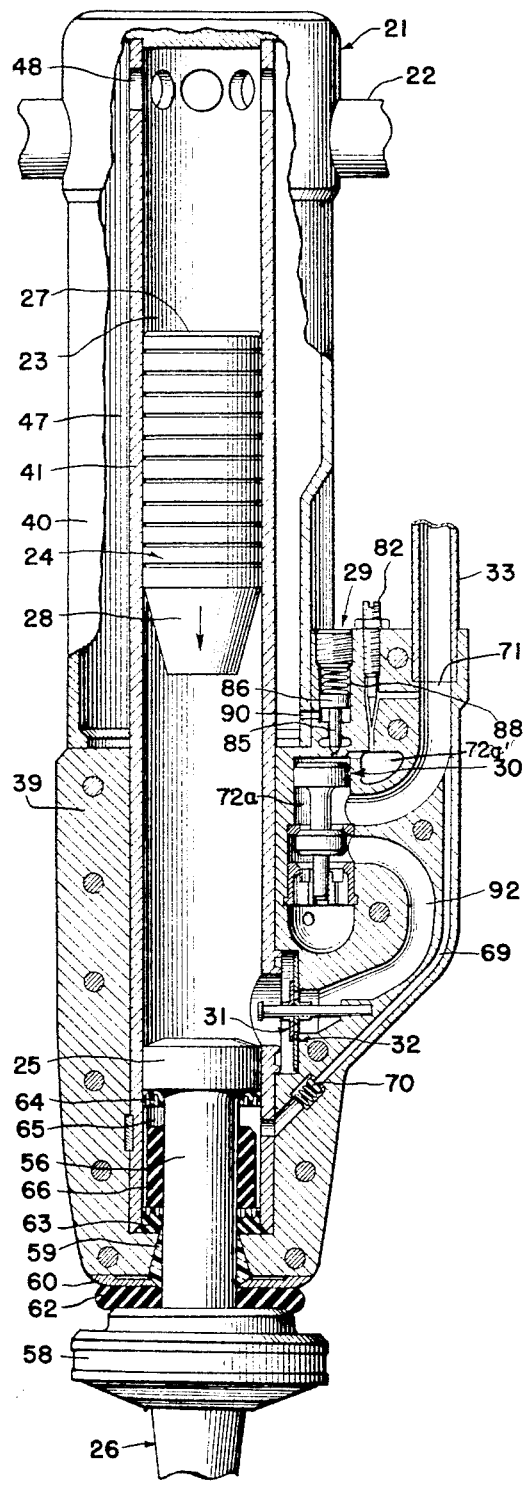
Figure 13:
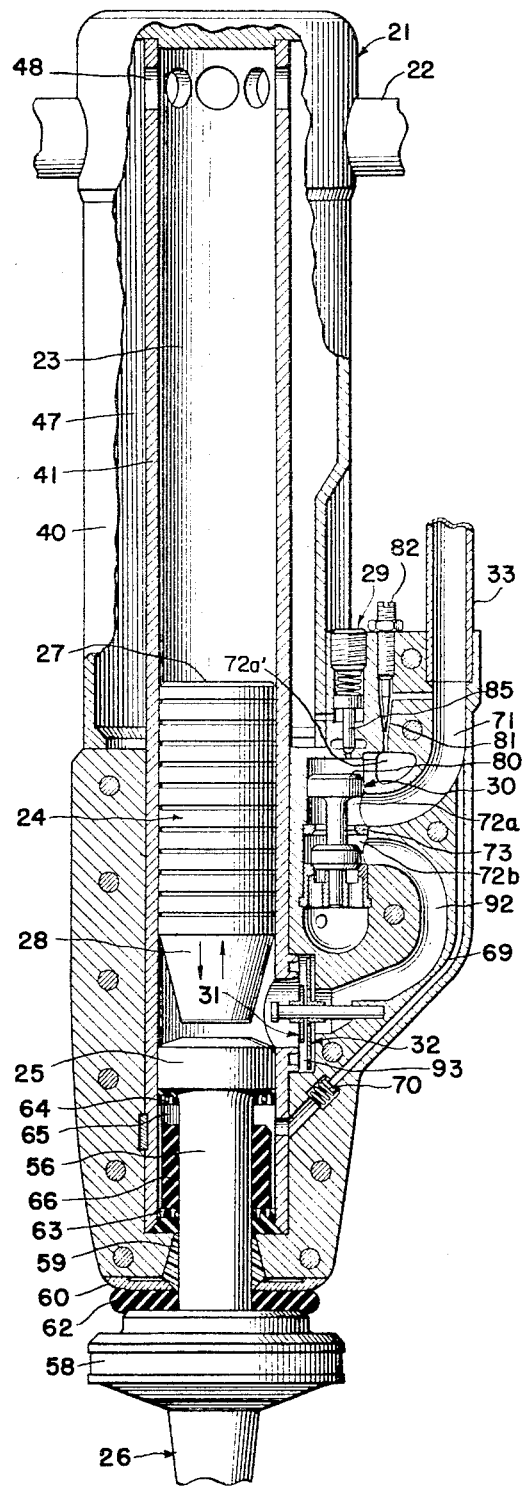
Figure 13A:
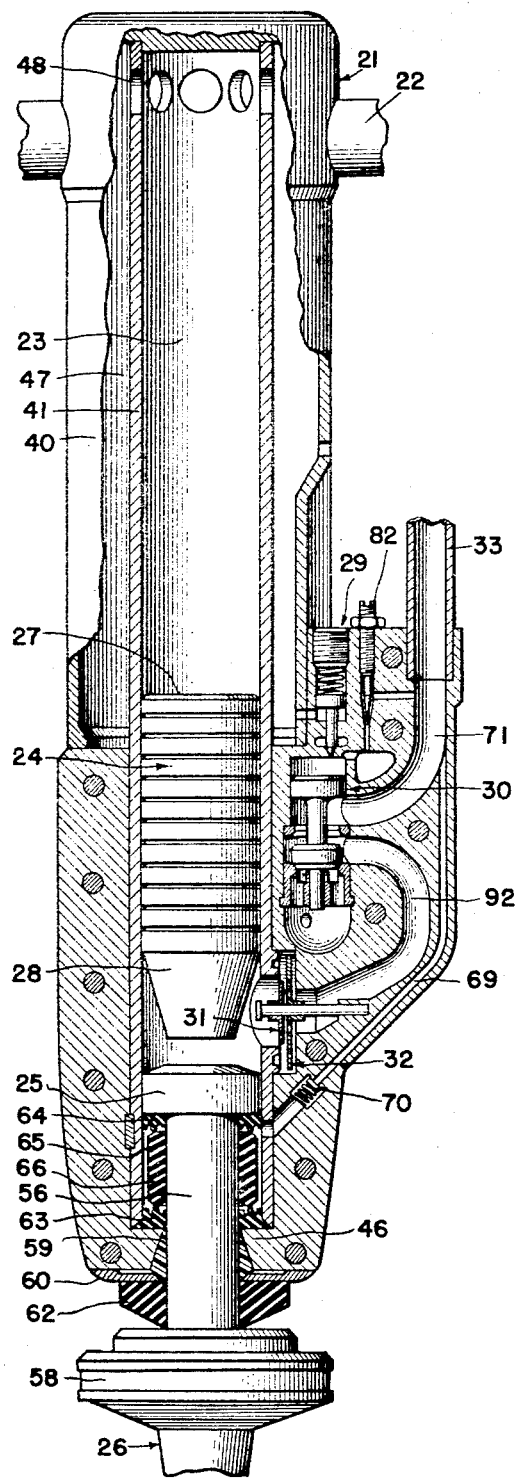
Figure 13B:
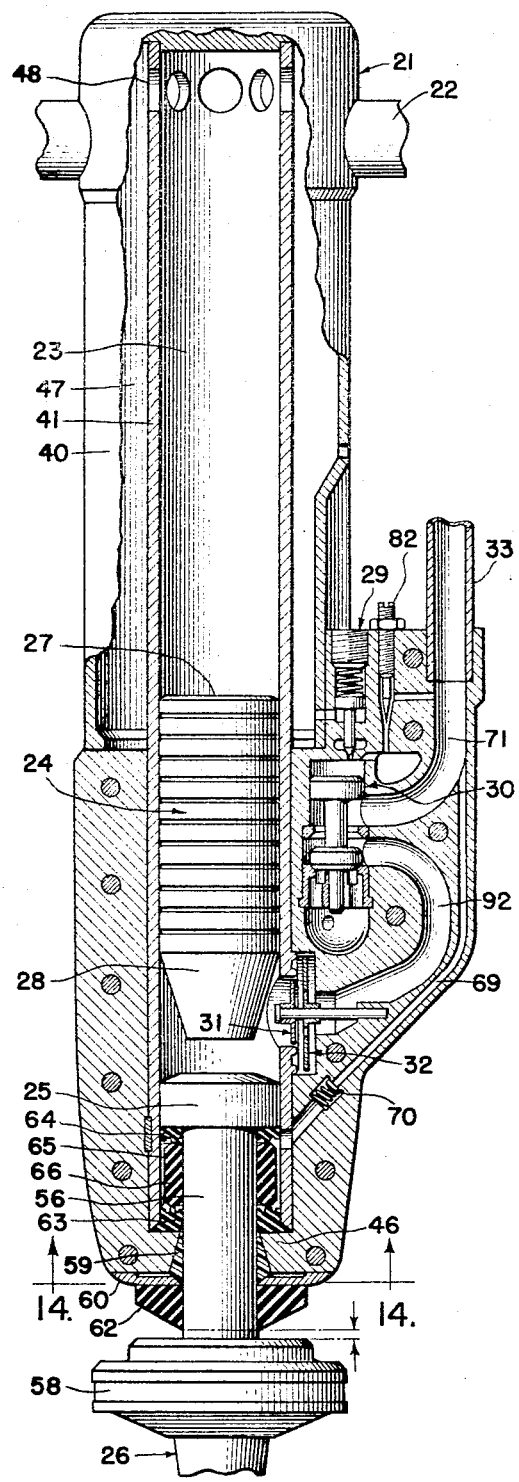

In FIGURE 11 the hammer has reached its maximum travel and commences the downstroke thereof, and all of the pilots and valves are in the same condition as in FIGURE 10, except that the over-pressure valve has been closed;

In FIGURE 12 the hammer has proceeded into its downstroke, and both the inlet pilot valve and inlet valve are closed, and the exhaust pilot valve and exhaust valve are in their exhaust position; and In FIGURE 13 the hammer has travelled downwardly into impact-engagement with the spike head and has bounced upwardly therefrom, the inlet pilot valve is closed, and the inlet valve is open as are the exhaust pilot and exhaust valves, which then completes one cycle of operation;

FIGURE 13A illustrates the relative position of the tool casing and spike or work member when the casing is in a normal high position with respect to the spike;

FIGURE 13B illustrates the relative position of the tool casing and spike or work member when the casing is in an abnormally high position with respect to the spike;

FIGURE 13C illustrates the relative position of the tool casing and spike or work member when the casing is in an abnormally low position with respect to the spike;

FIGURE 14 is a transverse sectional view taken along the plane 14—14 of FIGURE 13B;

FIGURE 15 is an enlarged fragmentary view of certain of the buffer elements associated with the control system for the spike or work member; and FIGURE 16 is an enlarged fragmentary sectional view of a modified inlet valve assembly.

*General statement of the tool and its operation*

The pneumatically actuated vibrationless percussive tool illustrated in the drawings in a heavy-duty paving breaker, generally designated with the numeral 20. The tool 20 includes a casing 21 equipped with handles 22, and the casing defines therein a cylinder 23 having a hammer or blow-striking piston 24 reciprocable along the longitudinal axis thereof. At one end of its cycle of reciprocation, the hammer 24 is adapted to strike or deliver impact force to the upper end or head 25 of a spike or work member 26 which transmits such impact force to a slab of concrete or other work material to break or demolish the same.

The hammer 24 is continuously urged toward impact-engagement with the head of the spike 26, which position of impact is shown in FIGURE 1, by a pressure force acting downwardly upon the upper face 27 of the hammer and, as indicated hereinbefore, the value of such pressure force is "substantially constant." The backstroke of the hammer 24 is energized by a charge of compressed air admitted into the cylinder 23 adjacent the lower end thereof, which acts upwardly against the lower end portion 28 of the hammer. Such charges of compressed air are cyclically admitted into the lower end portion of the cylinder 23 under the control of a valve system which, in general, comprises an inlet pilot valve assembly 29, an inlet valve assembly 30, an exhaust pilot valve assembly 31, and an exhaust valve assembly 32. Compressed air is supplied to the control valve system through a tube or conduit 33 that is connected to a coupling or inlet conduit 34 through a manually operable on-off valve 35 having an actuating lever 36 located at one of the handles 22 so as to be conveniently gripped and depressed by the tool operator.

The inlet conduit 34 is adapted to be connected to a source of compressed air which may have a pressure value selected from a fairly wide range—for example, line pressures of from 40 to 120 p.s.i.g. having been used—and in the particular tool illustrated, a line pressure of 47 p.s.i.g. has been found to be quite satisfactory. Line pressure is supplied to the control valve system only when the manually operable valve 35 is open. However, pressurized air is continuously available to the upper end portion of the cylinder 23 since it is connected to the inlet line 34 upstream of the valve 35. A substantially conventional pressure regulator 37 establishes the pressure within the upper end portion of the cylinder 23 at some predetermined minimum value, and such pressure is substantially below line pressure and usually will be about 50% of the value thereof. A connector conduit 38 comprises a part of the flow passage system connecting the upper end of the cylinder 23 with the inlet conduit 34, and the connector 38 extends between and is in open communication with both the inlet conduit 34 and pressure regulator 37.

In operation of the tool, it will have initially the configuration illustrated in FIGURE 1 in which the hammer 24 is held in engagement with the head 25 of the spike 26 by the pressure force continuously present in the upper end portion of the cylinder 23 whenever the inlet conduit 34 is connected to a source of compressed air. When the manually operable valve 35 is opened, as shown in FIGURE 2, the control valve system functions to admit a charge of compressed air into the lower end portion of the cylinder 23; and because the pressure force acting upwardly against the hammer is superior in value to that of the substantially constant pressure force urging the hammer 24 downwardly, the hammer will be reciprocated upwardly toward the position of its maximum upward displacement, which is illustrated in FIGURE 11.

After the hammer attains such position of maximum upward displacement, which completes the backstroke phase of the reciprocatory cycle, it is accelerated downwardly toward impact with the head 25 of the spike 26. The inlet pilot assembly 29, inlet valve assembly 30, exhaust pilot assembly 31 and exhaust valve assembly 32 function in an inter-related manner to alternately and successively supply compressed air charges to the lower end portion of the cylinder 23 to energize the backstroke of the hammer 24, and to exhaust such lower end portion of the cylinder to permit the hammer to be reciprocated downwardly through the blow-stroke thereof. The operation of the control valve system is automatic, and it functions in response to pressure variations in the substantially constant pressure maintained within the upper end portion of the cylinder 23 which are caused by the reciprocatory displacements of the hammer 24.

*The structure in detail*

The casing 21 is formed in three main sections that constitute a fronthead 39, backhead 40 and a liner 41 which extends, essentially, from end to end of the tool and defines the cylinder 23. The fronthead 39 (as is shown most clearly in FIGURES 1A and 1B) is made in two longitudinally extending, generally arcuate parts which are bilaterally symmetrical with respect to and hermetically juxtaposed along a longitudinal plane containing the axis of such cylinder. These symmetrical parts are respectively denoted with the numerals 39a and 39b and are held together by a plurality of pins or bolts 42. Consistently with well known practice (since split or separable-section constructions of such type—often referred to as "face-seal mounts"—have long been in use, for example, in the hydraulic control system of automobile transmissions and of machine tools and also in the pneumatic control of autopilots for aircraft), the juxtaposed surfaces of the parts 39a and 39b may be machine- or lap-finished, depending upon the hardness of the metal used, to contactually effect a fluid tight seal directly therebetween. But usually and alternatively, a gasket 43 interposed between the two halves of the fronthead prevents leakage therebetween; and such gasket, for example, may comprise a thin coating of one of the commercially available mastic materials such as Permatex, or a fibrous gasket preferably having a thickness of from 0.015 to 0.020 of an inch. It should be understood, however, that for purposes of the present invention no special significance other than specific exemplification attaches to the particular fabrication technique used to form the fronthead 39, backhead 40 and/or liner 41, or, for that matter, any of the other components of the tool; but in case the separable-section construction is employed, the smaller cylinder spaces having reciprocable components therein may also be equipped with special sleeves or liners for closer tolerance sealing action in accordance with previously successful practice.

The backhead 40 (which is in the form of a shell) at its lower end may be welded or otherwise secured to the fronthead 39 in any conventional manner; and at its upper end is equipped with a closure cap 44 that seats downwardly upon the upper end of the liner 41, and is preferably provided with an offset boss 45 that nests within the open upper end of the liner to stabilize the same in a centered relation within the casing. At its lower end, the liner 41 seats upon an inwardly extending annular shoulder 46 provided by the fronthead; and, therefore, the liner is constrained against axial displacements in one direction by the shoulder 46 and in the opposite direction by the cap 44 which, as is evident in FIGURE 1, carries the tool handles 22.

The backhead 40 is spaced radially outwardly from the liner 41 with the result that a tank space 47 of relatively large volume is defined therebetween, and that portion of the cylinder 23 which is disposed between the upper face 27 of the hammer 24 and the boss 45 of the cap 44 is in open communication with the tank space 47 through a plurality of relatively large ports 48. The total cross sectional area of all of the ports 48 is sufficiently great that compressed air may flow back and forth therethrough in accordance with the reciprocatory displacements of the hammer 24 without being significantly restricted, whereby no material pressure gradients are developed across such ports. The total volume defined by the tank space 47, the ports 48, and that portion of the cylinder 23 disposed between the hammer face 27 and boss 45 may be referred to hereinafter as the "constant pressure space"; and such total volume is sufficiently great relative to the changes therein caused by the reciprocatory displacements of the hammer 24 that the pressure within such space remains substantially constant (as explained in greater detail hereinafter) during each cycle of reciprocation of the hammer.

Compressed air is continuously maintained within the constant pressure space because the tank space 47 is connected to the inlet conduit 34 through the tube 38, pressure regulator 37, and a port 49 in the wall of the backhead 40 which communicates with the low pressure outlet chamber provided within the interior of the pressure regulator. Such outlet chamber is connected with the high pressure inlet chamber of the regulator through a port 50 having a valve seat thereabout, and the high pressure chamber is in open communication with the tube 38. The flow of high-pressure compressed air through the port 50 is controlled by a valve 51 which is biased into the open position thereof illustrated in FIGURE 1 by a helical compression spring 52—the biasing force of which may be selectively adjusted by a screw 53 which provides a seat for the spring at one end thereof. When the pressure within the outlet chamber, which is connected with the port 49, reaches a value such that the resultant force on the regulator diaphragm 54 overcomes the biasing force of the spring 52, the valve 51 is displaced to close the port 50 and thereby terminate the flow of compressed air into the tank space 47.

The pressure regulator 37 establishes the minimum pressure within the constant pressure space, and it has been found that for best results such pressure will usually be in the order of 50% of the line pressure. Therefore, taking the foregoing exemplary value of 47 p.s.i.g. as the line pressure, the minimum pressure in the constant pressure space may be approximately 22 to 24 p.s.i.g. However, the value of such minimum pressure can be selectively changed by suitable adjustment of the screw 53 to alter the biasing force exerted by the spring 52 against the valve 51.

At the upper end of its reciprocatory stroke, the hammer 24 approaches the boss 45 (as shown in FIGURE 11); and to prevent metal-to-metal impact therebetween in the event that the hammer is accelerated upwardly through its backstroke to a greater extent than is the ordinary case, an air cushion is established between the hammer face 27 and boss 45 because the ports 48 are axially spaced from the lower surface of the boss and are therefore closed by such movement of the hammer. At the opposite end of its reciprocatory cycle, the hammer 24 is intended to strike the enlarged head 25 of the spike 26 (as shown in FIGURE 1) to deliver impact force thereto.

The spike head 25 slidably engages the cylinder-defining inner surface of the liner 41 as does the hammer 24; and consequently, the axially projected areas of the spike head 25 and of the lower end portion 28 of the hammer are equal even though the hammer end portion 28 tapers inwardly and has a frusto-conical configuration—the purpose of which is to form with the circumjacent cylinder wall a relatively large space into which the intermittent charges of compressed air are quickly admitted to energize the backstroke of the hammer. To further facilitate this result, a large flow port 55 is provided in the liner 41 and serves as both an inlet and outlet port, as will be brought out in greater detail hereinafter.

The spike 26 has a stem 56 of reduced cross section formed integrally with and disposed below the head 25, and it terminates in a tapered work point 57 which, for example, may be of the type disclosed in the copending application of Charles Leavell, Serial No. 208,436, filed July 9, 1962, and in particular may have the "quick-sticking" characteristics disclosed therein so that the spike point is frictionally gripped and constrained by a work material almost immediately after the point has penetrated such material. Additionally, the spike 26 is a unitary component from end to end thereof, and may be a permanent spike of the type disclosed in said pending patent application. Furthermore, the spike 26 is a self-extracting work member, and is equipped with an elastic energy storage structure 58, which may be of the type disclosed in the patent of Gordon A. Cooley, No. 3,043,288, that functions to automatically extract the point 57 from the frictional grip of a work material which has been penetrated by the spike to the depth of the element 58. Evidently then, the hammer 24 transmits impact force to the spike 26 by delivering blows directly thereto; and therefore, the requirement for a separate anvil or tappet member which is present in many conventional tools is omitted. Avoidance of the requirement for a separate anvil permits the stroke length of the hammer to be increased which enables the tool to have a higher working speed, and it also results in a positive avoidance of "rattling degeneration" of the blow energy as defined and explained in Leavell Patent No. 3,028,841.

Circumjacent the stem 56 of the spike is an annular friction element 59 that tightly and frictionally grips the spike stem. The friction element 59 may be sectioned to permit assembly about the stem, and its outer surface tapers downwardly and outwardly so as to seat within an opening having a complementary taper which is provided centrally in the inwardly turned shoulder 46 of the fronthead 39. The friction element is held within this opening by a preloading diaphragm spring or retainer 60 which, as shown most clearly in FIGURE 14, is segmented for assembly purposes and is preferably composed of at least three parts to minimize nonuniformity thereabout of the preloading stresses applied to the friction element. The retainer 60 has an offset perimetric heel 60a, and is adjustably secured to the fronthead by a plurality of cap screws 61 spaced inwardly from the heel 60a. As a result of this arrangement, the friction element 59 is rigidly constrained against axial displacements in an upward direction relative to the tool casing, but is flexibly or resiliently constrained against axial displacements relative thereto in the downward direction. In this connection, the included angle defined by such mating tapers should be greater than the maximum angle that establishes a locking taper for the particular materials used (about 15° for steel to steel); and in the present structure, an angle of about 30° has been adopted.

The frictional resistance developed between the element 59 and spike stem 56 is selectively determined by adjustment of the preloading spring retainer 60; and because the preload force can be properly selected and because of the material composition of the element 59, such element can be provided with the characteristics of relatively high static friction and low dynamic friction in relation to the spike stem 56. In being constrained by the casing and frictionally gripping the spike stem 56, the friction element provides a bearing support for the spike as does the head 25 of the spike. Since the head and friction element are axially spaced by a substantial distance, the resultant bearing system not only guides the spike for displacements along the axis of the tool but also is highly resistant to angular forces that tend to cant or deflect the spike relative to the casing. The friction element also has good resistance to wear, serves as a seal to exclude ambient abrasives from the tool interior, and further serves to dampen oscillations of the spike because of its transductance of substantial increments of impact energy; and a material found to be quite satisfactory for the friction element is a molybdenum-disulfide-modified nylon.

Also circumjacent the spike stem 56 are a plurality of resilient buffer seals 62, 63 and 64 that are most desirably formed of an elastomeric urethan of durometer 70–90 on the Shore A scale. The buffer or cushion 62 is exterior of the tool casing and is disposed between the retainer 60 and the elastic energy storage unit 58. As illustrated in FIGURE 1, the buffer is compressed somewhat and this is the normal condition thereof when the tool is in a neutral or dormant state with pressure in the chamber 65, as described in detail hereinafter. In its unstressed condition (which may be assumed thereby during intervals of reduced pressure in the chamber 65) the buffer 62 has the configuration shown in FIGURES 13A and 13B; and it may be bonded or otherwise secured to the retainer 60, and segmented in correspondence therewith, so as to travel with the casing.

The buffer 63 is constrained against axial displacements relative to the casing because it is confined against the shoulder 46 of the casing front-head by the lower edge of the liner 41. The buffer 64 has an inner diameter substantially smaller than the outer diameter of the spike stem 56, and is therefore maintained in place adjacent the under surface of the spike head 25 by friction. Additionally, however, the buffer seal 64 is held in place by the pressure force acting thereon as a consequence of pressure developed within the chamber 65. The facing surfaces of the buffer seals each have two annular channels formed therein of V-shaped cross section, as shown best in FIGURE 15; and such channels are separated by a central land having an axial dimension substantially greater than that of the buffer edge portions adjacent each of the V-shaped channels, which edge portions define sealing lips respectively engaging the spike stem and cylinder wall. The function of such raised lands is to protect the respectively associated seal lips from damage, as further described in the following paragraph.

The buffer 63 and 64 are axially spaced along the spike stem 56, and define therebetween a cushion chamber 65 adjacent the lower end of the liner 41 and cylinder 23 defined thereby. Mounted within such chamber intermediate the buffers 63 and 64 (which serve as the end closures for the chamber) is a resilient collar 66. The collar has its inner and outer edges relieved at each end thereof, as shown best in FIGURE 15, so that it engages the buffers 63 and 64 only at the lands thereof, whereby any resulting deformation of the buffers is confined to the lands and is isolated from the lips by the V-shaped grooves. The collar 66 is mounted in circumjacent relation with the spike stem 56, and serves to intensify the forces developed within the chamber 65, as will be described in detail hereinafter. The collar 66 is slightly smaller in transverse section than the cylinder 23 to provide sufficient clearance with the cylinder wall for transverse deformation when the collar is axially compressed (see FIGURE 13B), and has a polygonal configuration in transverse section that is preferably pentagonal or hexagonal. Under ordinary conditions of operation, the axial length of the collar 66 may be somewhat less than the axial length of the chamber 65.

Communicating with the chamber 65 through a port 67 located intermediate the ends thereof is a passage 69 delivering compressed air to the chamber through a spring biased check valve or over-pressure valve 70 interposed therein. The passage 69 is relatively small in cross section (registration thereof with the port 67 being enforced by a key 68 that establishes proper alignment of the liner 41 with the fronthead 39), and it extends upwardly through a radially-extending enlargement provided by the fronthead 39 along one side thereof and opens into a larger passage 71 that communicates with the aforementioned tube 33 connecting with the inlet conduit 34 through the manually operable on-off valve 35. The check valve 70 permits compressed air to flow from the passage 69 and into the chamber 65, but prevents the flow of compressed air in the opposite direction.

The flow passage 71 extends downwardly from the point of its connection with the tube 33, turns inwardly toward the cylinder 23, and opens into an axially elongated chamber forming a part of the inlet valve assembly 30. The chamber is divided into three sections, respectively denoted with the numerals 72a, 72b and 72c—the first two of which are separated by an annular inlet port and valve seat 73. The section 72a at the upper end thereof is effectively enlarged volumetrically by open communication thereof with a chamber or space 72a', the purpose of which will be explained hereinafter. The section 72c of the inlet valve chamber is maintained at atmospheric pressure (see FIGURE 1B) through a pair of relatively large exhaust passages 74a and 74b, and an insert 75 located in the chamber section 72b adjacent the section 72c defines a valve seat 76 at the upper end thereof.

The insert 75 has a centrally oriented support 77 therein provided with a bore therethrough that slidably receives the stem 78 of the inlet valve and forms a bearing therefor. Evidently then, the inlet valve is reciprocable along the axis of the stem 78 (which is substantially parallel to the axis of reciprocation of the hammer 24 in the specific tool being considered); and it includes both a valve element 79 disposed between the valve seats 73 and 76 for selective engagement therewith and a piston 80 that is located within the chamber section 72a and slidably and sealingly engages the walls thereof. The inlet valve is, most desirably, of relatively low mass so as to permit rapid response to pressure changes controlling the position thereof, and may be formed of aluminum or other suitable light weight material.

The inlet valve is shown in its lowermost position in FIGURE 1, which makes it apparent that the passage 71 communicates with the chamber section 72a below the piston 80 (that is, intermediate the piston 80 and valve seat 73), and that the upper end portion of the chamber section 72a which is pneumatically isolated from the passage 71 by the piston 80 is connected with the passage through a small bleeder passage network 81 having an adjustable needle valve 82 interposed therealong. The rate of flow of compressed air from the passage 71 into the upper end portion of the chamber section 72a is limited by the small cross section of the passage network 81, and is further adjustably controlled by the position of the needle valve 82.

The upper end portion of the chamber section 72a is also connected with an exhaust space or chamber 83 through a small passage 84 having a valve seat therealong adapted to be closed by a valve element 85 comprising a stem that passes upwardly through the chamber 83 and carries at its upper end a piston 86 reciprocable within a cylinder 87. The valve 85 is biased downwardly and into engagement with the valve seat, to close the passage 84, by a helical spring 88—the biasing force which is selectively adjustable by a screw 89. The cylinder 87 adjacent the lower end thereof and below the piston 86 is connected to the constant pressure space 47 through a small port 90, and the chamber 83 is maintained at atmospheric pressure through a pair of exhaust passages 91a and 91b (see FIGURE 1C). The valve 85, piston 86, cylinder 87, and components associated therewith form the aforementioned inlet pilot valve assembly 29.

The pressure-response function of the piston 86 is entirely satisfactory when the spring 88 is of an ordinary type in which the biasing force thereof progressively increases in magnitude as the spring is progressively compressed. However, the response function of the piston 86 is improved when the biasing force exerted thereagainst is substantially independent of the displacement thereof. This result can be obtained by use of a constant-force spring (a Belleville spring, for example), or by omitting the spring 88 and adjusting screw 89 and connecting the upper end portion of the cylinder 87 to the inlet conduit 34 through a conventional pressure regulator device operative to maintain the pressure within the cylinder space essentially constant irrespective of the position of the piston 86. Selective adjustment of the stroke length of the hammer 24 is attainable with such a pressure regulator device since the control pressure thereof is readily adjustable (as in the pressure regulator 37).

The chamber section 72b intermediate the valve seats 73 and 76 is connected by a passage 92 with a valve chamber 93 that opens into the cylinder 23 through the large port 55. The exhaust pilot valve 31 and the exhaust valve 32 are both mounted within the chamber 93, and each is in the form of a flat plate or disc having a central hub that is slidably mounted upon a pin 94 fixedly secured to the fronthead 39 and extending inwardly toward the axis of the cylinder 23 through the chamber 93 and port 55. At its inner end the pin 94 terminates adjacent the cylinder 23 in an enlarged head 95 that defines the inner limit of diplacement for the exhaust pilot 31.

Although the outer diameter of the exhaust pilot 31 is somewhat smaller than the diameter of the port 55, the outer diameter of the exhaust valve 32 is substantially greater than that of the port 55 and it is adapted to reciprocate along the pin 94 between two extreme positions respectively defined by the end wall 96 of the chamber 93, which is the exhaust position of the valve (see FIGURES 10 through 12, for example), and by the opposite end wall 97 thereof provided by the liner 41 and defining the enlarged flow port 55, which is the admittance position of the valve (see FIGURES 6 through 9). In this latter position, the exhaust valve 32 is sufficiently large (see FIGURE 1A) to sealingly close an annular channel 98 circumjacent the port 55, which is maintained at atmospheric pressure through a pair of exhaust passages 99a and 99b connected therewith, as shown in FIGURE 1A, and preferably extending arcuately along the annular channel 98 at their respective points of connection therewith in order to provide an enlarged exhaust area of the same order of magnitude as that of the exhaust port 55.

The exhaust pilot valve 31 is reciprocable along the pin 94 between an innermost limit in which it abuts the enlarged head 95 of the pin (see FIGURES 6 through 8), which is the admittance position of the pilot, and the limit defined by abutment with the valve 32 when it is in engagement with the surface 96 (see FIGURES 10 through 12), which is the exhaust position of the pilot. In this latter position of the pilot valve, it closes a plurality of openings 100 (see FIGURE 1D) in the exhaust valve 32—the combined area of such openings or inlet ports preferably being equal to or greater than the area of the inlet valve which is established by the opening through the valve seat 73.

Operation

In operation of the tool, the inlet conduit 34 is connected to a source of compressed air which, by way of example and as suggested hereinbefore, may have a pressure of approximately 47 p.s.i.g. Assuming the manually operable on-off valve 35 is closed, the various components of the tool will have the relative positions shown in FIGURE 1, and a reduced pressure will be present within the constant pressure space comprising the tank 47, ports 48 and upper end portion of the cylinder 23 above the hammer 24. It has been found that the maintenance of a minimum pressure within the constant pressure space which approximates 50% of the line pressure results in excellent operation of the tool; and taking the exemplary value of 47 p.s.i.g. for the line pressure, the minimum pressure within the constant pressure space will be in the range of about 22 to 24 p.s.i.g. The pressure regulator 37 functions in a conventional manner to provide the requisite pressure drop thereacross and to maintain the minimum value of the pressure within the constant pressure space. Quite apparently, such pressure can be selectively changed by varying the stress in the spring 52, and increasing the spring force will necessarily increase the value of the minimum pressure, and vice versa.

In initiating a demolition operation, the lever 36 is depressed to open the manually operable valve 35; and at that time the various components of the tool will have the relative positions shown in FIGURE 2, which are substantially identical to those shown in FIGURE 1 except that the valve 35 is open. Immediately after the valve 35 has been opened, compressed air flows downwardly through the tube 33 and passage 71 into the chamber section 72a of the inlet valve assembly 30; and as a consequence, the inlet valve is accelerated upwardly until the valve 79 closes against the undersurface of the valve seat 73.

The reason that the inlet valve is displaced upwardly in this manner is that the compressed air entering the chamber section 72a through the passage 71 acts upwardly against the undersurface of the piston 80 and downwardly upon the upper surface of the valve 79; and since the effective area of such surface of the piston 80 is greater than the area of the facing surface of the valve 79, a net upwardly directed force is applied to the inlet valve to move it upwardly and into closing relation with the seat 73, as shown in FIGURE 3. It is apparent that the only other forces acting upon the inlet valve at this time are the upwardly directed atmospheric pressure applied against the underside of the valve 79 (the chamber section 72c being maintained at atmospheric pressure because of its connection with the exhaust passages 74a and 74b) and the downwardly directed, essentially atmospheric pressure acting against the upper surface of the piston 80 (the restricted passage network 81 and needle valve 82 materially retarding the flow of compressed air into the upper end portion of the chamber section 72a to prevent a rapid rise in pressure therein; and the total volume of that portion of the section 72a above the piston 80, which necessarily includes the space 72a' in open communication therewith, being sufficiently large that no appreciable increase in pressure occurs therein as a consequence of the upward displacement of the piston).

Immediately after the inlet valve has been closed, the compressed air which has been flowing downwardly through the passage 69 because of its communication with the passage 71, but the rate of flow of which has been retarded somewhat by the relatively small cross section of the passage 69, acts against the check valve 70 to open the same whereupon compressed air enters the cushion chamber 65. The pressure attained within the chamber 65 approximates and even exceeds line pressure by several p.s.i.g. because of inertial effects, as will be elaborated more fully hereinafter. FIGURE 4 illustrates the relative orientation of the tool components with the check valve 70 open and with the inlet valve still in its closed position.

During the period that the manually operable valve 35 has been open (FIGURES 2, 3 and 4), the pressure within the upper end portion of the chamber section 72a has been slowly building up because of its connection through the restricted passage network 81 and needle valve 82 with the tube 33, which is at line pressure. The pressure fluid building up in the upper end of the chamber section 72a acts downwardly upon the upper face of the piston 80 and eventually reaches a value at which the net upwardly directed force which has been acting on the piston is exceeded, whereupon the total force then acting upon the inlet valve is downwardly directed and the inlet valve is displaced downwardly until the valve 79 sealingly engages the seat 76, as shown in FIGURE 5.

With the inlet valve thus in open position, compressed air flows through the passage 71, into the chamber section 72a, past the valve seat 73 and into the chamber section 72b, outwardly therefrom through the passage 92 and into the valve chamber 93. The compressed air discharging from the passage 92 and into the chamber 93 impinges upon the outer face of the exhaust valve 32 and displaces the same toward the surface 97, and into sealing engagement therewith to close the exhaust channel 98 and exhaust passages 99a and 99b. Therefore, the exhaust valve 32 is shifted from the approximate position thereof illustrated in FIGURES 1 through 5 and into the position shown in FIGURE 6. With the valve 32 thus in closed position, the compressed air flows through the plurality of ports 100 therein, impinges upon the exhaust pilot valve 31 and displaces the same to its maximum inward position (as shown in FIGURE 6) in which it is removed from from the valve 32 and is in substantial abutment with the enlarged head 95 of the pin 94. Since the exhaust pilot valve 31 is substantially smaller than the port 55, compressed air then flows freely through the ports 100, about the pilot valve and through the enlarged port or opening 55, and into the interior of the cylinder 23 about the tapered lower end 28 of the hammer 24.

The sudden charge of compressed air admitted into the cylinder 23 about the lower end 28 of the hammer acts upwardly against the hammer 24; and because the pressure value of such charge is substantially the same as line pressure, the hammer is propelled upwardly. It is apparent that the only appreciable forces acting against the hammer at this time are the downwardly directed forces resulting from the pressure acting upon the upper face 27 of the hammer and the upwardly directed force acting against the lower end 28 of the hammer; and since the value of the intermittent pressure charge below the hammer materially exceeds that of the continuous pressure acting downwardly upon the upper face 27 of the hammer (the pressure at the lower end of the hammer being almost double that of the pressure at the upper face thereof), and because the axially projected areas of both the upper face 27 and lower surface of the hammer are equal, a net upwardly directed force acts against the hammer to propel the same upwardly.

The hammer 24 in being displaced upwardly, as shown in FIGURE 7, causes the air within the constant pressure space to be compressed somewhat because the total volume of such space is decreased by the displacement of the hammer. As a consequence, the value of the pressure within the constant pressure space increases somewhat which causes an additional volume of air to be expressed through the port 90 and into the cylinder 87, with the result that a pressure force of increased value acts upwardly against the under surface of the piston 86 of the inlet pilot valve 85. Since the value of the pressure within the constant pressure space progressively increases as the hammer 24 continues to be displaced upwardly, the pressure force acting upwardly against the piston 86 continues to increase in value until it exceeds the biasing force of the spring 88, at which time the inlet pilot valve is displaced upwardly to open the passage 84, which is significantly larger in cross sectional area than the maximum cross sectional adjustment of the needle valve, and thereby exhaust the upper end portion of the chamber section 72a to atmosphere through such passage 84, the chamber 83, and the exhaust passages 91a and 91b (see FIGURE 1C).

As a result of such upward displacement of the inlet pilot valve 85 and exhaustion of the chamber section 72a, the value of the pressure force acting downwardly upon the upper surface of the piston 80 of the inlet valve is decreased to atmospheric and, again, the net force active upon the inlet valve is upwardly directed (as explained hereinbefore), so that the inlet valve is displaced upwardly to close the opening through the valve seat 73, as shown in FIGURE 8. Therefore, the flow of pressure fluid into the cylinder 23 through the large port 55 is terminated, and the pressure acting against the outer face of the exhaust valve 32 is decreased to atmospheric because the valve chamber 93 and passage 92 are thus connected to atmosphere through the valve seat 76, inlet chamber section 72c, and exhaust passages 74a and 74b.

The abrupt termination of the high velocity flow of compressed air through the conduit 34, tube 33 and passage 71 resulting from sudden closure of the opening through the valve seat 73 causes an increase in mass per unit volume of air at the vicinal spaces of the passage termini (chamber section 72a and check valve 70). This results in high pressure air (approximating or exceeding line pressure) of a pressure sufficient to momentarily open the check valve 70 to admit such high pressure air into the cushion chamber 65, as shown in FIGURE 9. The check valve thereafter closes during the early stages in the decay of such over-pressure, as shown in FIGURE 11.

Also as shown in FIGURE 9, the exhaust pilot valve 31 has been displaced toward the exhaust valve 32 and into engagement therewith because of the pressure differential thereacross—the pressure within the cylinder 23 being above atmospheric and that within the chamber 93 being atmospheric; and for this same reason, both the exhaust pilot valve and exhaust valve are displaced along the pin 94 until the latter engages the surface 96 which defines the extreme limit of displacement in that direction, as shown in FIGURE 10. At this time then, that portion of the cylinder 23 which is intermediate the hammer 24 and head 25 of the spike is exhausted to atmosphere through the large port 55, channel 98 and exhaust passages 99a and 99b.

After the lower end portion of the cylinder 23 is exhausted, the upward momentum of the hammer 24 carries it to its maximum displacement, which is shown in FIGURE 11, and the hammer then commences its downward movement during which it is accelerated by the continuous pressure force acting downwardly against the upper face 27 thereof. As the hammer is propelled downwardly, the effective volume of the constant pressure space increases in accordance with the downward displacement of the hammer; and as a result, the value of the pressure within the constant pressure space progressively diminishes and the excess air which had been expressed through the port 90 flows in a reverse direction therethrough, which diminishes the value of the force acting upwardly against the undersurface of the piston 86 of the pilot valve, whereupon the force of the spring 88 biases the pilot valve 85 into the closed position thereof, as shown in FIGURE 12.

The hammer continues to be accelerated until its downward movement is abruptly terminated by impact with the head 25 of the spike, from which impact the hammer may bounce upwardly slightly as shown in FIGURE 13. After the inlet pilot valve 85 has been closed (as shown in FIGURE 12), the pressure within the chamber section 72a above the inlet valve piston 80 commences to slowly increase in value, because of the flow of compressed air thereto through the restricted passage network 81 and needle valve 82, until the value thereof is sufficient to displace the inlet valve downwardly to uncover the valve seat 73 whereupon line pressure commences to flow through the passage 71, chamber section 72a, through the opening in the valve seat 73, through the chamber section 72b, into the passage 92, and through the valve chamber 93 and into the cylinder 23 to energize another cycle of reciprocation of the hammer 24. The tool is then in the condition shown in FIGURE 5, and the cycle of operation just described is repeated for as long as the manually controlled valve 35 is open. When such valve is closed, the tool will return to the state thereof illustrated in FIGURE 1—the chamber 65 remaining pressurized because of the buffer seals 63 and 64 and the check valve 70.

Although the cycle of operation has been described in terms of distinct steps or individual phases, it should not be assumed that considerable time elapses therebetween for this is not the case and, in fact, the frequency of the reciprocatory motion of the hammer 24 is usually several hundred cycles per minute, and a tool of the general type illustrated has been successfully operated within a range of about 60 cycles to approximately 425 cycles per minute which represents a factor of about seven in the selectively varied frequency. The cycle frequency of the hammer motion is readily altered by adjustment of the needle valve 82 which, if closed completely, would reduce the frequency to zero (since the inlet valve would continuously remain in its closed position, as shown in FIGURE 3, for as long as the valve 35 was open); and as the opening controlled by the needle valve is progressively enlarged, the cycle frequency of the hammer is increased because the rate of flow of compressed air through the passage network 81 is increased, whereupon the inlet valve is displaced more quickly from the closed position shown in FIGURE 3 to the open position thereof shown in FIGURE 5.

As is set forth more fully in the aforementioned Leavell Patent No. 2,679,826, a tool of the type being considered herein is adapted to deliver massive blows which, for example, may be in the range of 300 to 600 foot-pounds per blow in contrast to blows in the order of 50 foot-pounds delivered by ordinary tools. Heavy blows of such magnitude are exceedingly effective in demolishing heavy concrete slab. However, there are instances where it is desired to decrease the magnitude of the blow energy (for any particular line pressure) delivered by the hammer 24 to the spike 26 as, for example, in certain trimming operations. Since the flow energy may be measured in terms of force multiplied by distance, the magnitude of the blow energy delivered by the hammer 24 is an increasing function of the length of the blow-stroke thereof. That is to say, if the hammer 24 is accelerated downwardly toward impact with the head 25 of the spike over a greater distance, the blow energy of the hammer at the time of impact will be greater than the instance in which the hammer is accelerated downwardly over a shorter distance.

In the present structure, the length of the reciprocatory displacement of the hammer 24 may be selectively altered by adjusting the screw 89 to alter the biasing force of the spring 88. For example, if the biasing force of the spring is increased, the inlet pilot valve 85 will not be displaced upwardly until the pressure rise in the constant pressure space attains a relatively high value, which higher value is attained by a greater upward displacement of the hammer. As a consequence, the hammer will be reciprocated downwardly toward impact with the spike through a relatively great distance. On the other hand, if the biasing force of the spring 88 is decreased, a smaller pressure rise in the constant pressure space will cause upward displacement of the inlet pilot valve 85—in which event the length of the reciprocatory displacement of the hammer will be decreased.

Quite evidently, then, the pressure change in the constant pressure space is a function of hammer displacement, and the displacement required to increase the pressure to a value sufficient to unseat the inlet pilot valve 85 determines the ultimate length of the reciprocatory displacement of the hammer (assuming, of course, sufficient axial dimension between the top surface 27 of the hammer and the bottom surface of the boss 45). The point at which the upward acceleration of the hammer is terminated is established by the unseating of the inlet pilot valve 85 because the position of the inlet valve 79 is controlled by the position of the inlet pilot valve; and therefore, immediately after the inlet pilot valve has been displaced upwardly to open the passage 84, the inlet valve is displaced upwardly to close the inlet opening through the valve seat 73, whereupon the charging of the cylinder 23 with compressed air is terminated, as is the upward acceleration of the hammer.

Altering the adjustment of the pressure regulator 37, as has been stated, changes the minimum pressure within the constant pressure space; and accordingly, any such change in adjustment may have some influence on both the stroke length and cycle frequency of the hammer 24. For example, if the pressure within the constant pressure space is increased, the hammer may not be displaced through the same length of backstroke and, also, it may be so displaced more slowly. However, adjustment of the pressure regulator is not usually employed as a prime order of influence on either stroke length of cycle frequency, but instead is used together with adjustment of the preload on the friction element 59 to tailor the tool for optimum operation at any given line pressure or range of line pressures. But it may be noted that significant changes can be made in the magnitude and frequency of the blows delivered by the hammer 24 to the spike 26 by changing the value of the line pressure; for evidently, any given stroke length can be preserved with any selected increase in the line pressure, together with properly associated increase in the lesser continuous pressure acting downwardly upon the hammer and in the force of the spring 88 acting upon the inlet pilot valve (and with appropriate adjustment of the opening provided by the needle valve 82), with consequent greater downward acceleration of the hammer and corresponding increases in the frequency and energy of the blows delivered thereby.

The handle-equipped casing 21 remains substantially vibrationless because no net, repetitively intermittent or otherwise cyclically variable force comprising a variable term of significant amplitude is normally active there-against during operation of the tool. More particularly, each successive charge of compressed air admitted into the cylinder 23 through the large port 55 acts upwardly against the hammer 24 and simultaneously reacts downwardly against the upper surface of the head 25 of the spike, the point of which is resting upon or is otherwise in contact with a work material. Evidently, all of such reactive pressure force is transmitted directly to the work material and is not applied against any transverse surface of the casing because the spike head 25 occupies the entire cross sectional area of the cylinder 23, as is apparent from the drawings. At the upper end of the cylinder, the continuous pressure force acting downwardly upon the upper face 27 of the hammer simultaneously reacts upwardly against the transversely oriented casing boss 45; and provided that this pressure force remains substantially constant throughout each cycle of reciprocation of the hammer, the casing normally remains substantially vibrationless throughout each such cycle of reciprocation because no significantly vibration-causing variable-valued forces are applied thereto.

As stated hereinbefore, that degree of constancy which is desired for the value of the continuous pressure acting downwardly upon the hammer may be selectively determined by properly relating the total volume of the constant pressure space to the changes in such total volume caused by the cyclic displacements of the hammer. For example, if the volume of the constant pressure space were infinitely large relative to such hammer displacements, no change in pressure would occur as a consequence thereof. However, an infinitely large constant pressure space is not required for the practical attainment of vibrationless performance of the tool, and it may be stated that the degree of constancy required to prevent the transmission of sensible vibration from the hammer to the casing is readily obtained with relatively small volumes of the constant pressure space and, by way of example, a constant pressure space having a volume not in excess of from 10 to 30 times the change in volume caused by the reciprocatory motion of the hammer produces excellent results, and the precise ratio selected will depend upon particular tool designs.

Clearly, and disregarding compensatory factors which will be considered hereinafter, any volumetric ratio may be selected which is in excess of that particular practically critical ratio which, if not equalled or exceeded, will cause sensible vibration to be introduced into the tool casing; and in the tool structure being considered, a ratio should be selected that approaches such critical limit so as to permit the continuous force acting downwardly upon the hammer to vary in value between the minimum value established by the pressure regulator 37 and some maximum value in substantial excess thereof. The purpose of this selection is to permit operation of the control valve system (comprising the inlet pilot valve assembly 29, the inlet valve assembly 30, the exhaust pilot valve assembly 31 and exhaust valve assembly 32) which is intended to be responsive to such changes in pressure and to function in accordance therewith to automatically control the repetitive intermittent admission of compressed air charges into the cylinder space below the hammer 24, and alternately to successively and intermittently exhaust such cylinder space.

In order to maximize permissible manufacturing tolerances and otherwise diminish the requirement for refinements in the valve system, the present tool structure permits selection of a volumetric ratio less than such particular critical ratio by including in its structural composition means for permitting variations during each cyclic displacement of the hammer 24 in the value of the continuous pressure acting downwardly thereupon of a magnitude which might otherwise introduce sensible vibration into the handle-equipped casing structure. Such means includes the aforementioned friction element 59 which is operative between the casing structure and spike 26, and functions to counteract and cancel the effects of such pressure variations which cause an upwardly directed force of significantly variable value to be applied against the casing structure. As a specific example, the pressure in the constant pressure space may vary in value from a minimum of about 22 to 24 p.s.i.g., when the hammer is in its lowermost position, to a maximum of approximately 41 p.s.i.g. when the hammer is in its uppermost position; and the friction element is effective to constrain the casing against axial displacements which otherwise would be caused by pressure variations of this order.

Therefore, and returning to the consideration of the summation of axial reaction forces operative upon the casing structure as a consequence of energizing the reciprocatory cycle of the hammer, the variable term of the pressure force of varying value acting between the casing and hammer is automatically opposed by an oppositely active frictional force developed between the friction element 59 and spike stem 56 (the spike being frictionally gripped by the work material almost immediately after the initial penetration thereof); and the casing does not vibrate as a consequence of the action of such variable term of the pressure force because the algebraic sum of this term and of the friction force opposing the same remains substantially constant.

An additional pneumatic pressure force active upon the casing structure is present in the cushion chamber 65. Such force acts upwardly through the buffer 64 against the spike head 25, and also acts downwardly upon the casing through that portion of the buffer 63 extending outwardly beyond the annulus or collar 66 and also through the annulus and underlying portion of the buffer. This pressure force normally remains substantially at line pressure, or at some over-pressure slightly thereabove as explained heretofore; and, consequently, it is not of the cyclically intermittent or otherwise cyclically varying type which would introduce cyclically recurrent vibration into the casing. One purpose of this pneumatic pressure force is to provide a continuously active force operative between the spike and casing which tends to maintain the same in optimum operational positions, such as the general position shown in FIGURE 1; and another purpose is to provide an axial feeding force which urges the casing structure downwardly relative to the spike and tends to move the casing downwardly in accordance with the rate of penetration of the spike into a work material when it is gripped thereby.

The only other axial forces operative upon the casing (excluding the manually-applied feeding force, if any, and neglecting small mechanical and fluid forces associated with the valve system, flow passages, etc.) are those defined by the buffer 62 when it is not totally decompressed (as shown in FIGURE 13B), and by the buffers 63 and 64 and annulus 66 when the spike and casing are displaced relative to each other such that the head 25 of the spike (in moving toward the inwardly turned shoulder 46 of the casing) compresses the buffers 63 and 64 and the annulus 66 disposed therebetween. However, the force variation caused by changes in the state of compression of the buffers and resilient annulus is not a cyclically intermittent or otherwise cyclically variable-valued force of the character which would introduce cyclically recurrent vibration into the casing; and the function of these components, in addition to that of preventing metal-to-metal impact between the casing and spike elements, is to cooperatively and conjointly act with the pneumatic pressure force active in the cushion chamber 65 to provide corrective compensation for variations in the magnitude of the manual downpush or external feeding force being applied by an operator to the handles of the tool during operation thereof.

More particularly, and referring to FIGURE 13A, if the feeding force manually and gravitationally applied to the casing structure is approximately equal to or perhaps slightly less than the feeding force for which the tool is designed (it should be understood as concerns all percussive tools that the effectiveness of the percussive output of any such tool is indispensably dependent upon the application to the tool of a feeding force urging it in the direction of delivery of such percussive output to the work object), the casing structure and spike may have the relative positions shown in this figure wherein the head 25 of the spike has been displaced downwardly with respect to the casing so that the buffer 64 is just engaging the annulus 66, which in turn is touching the buffer 63. Such position of the spike locates the elastic storage element 58 at a distance from the lower end of the casing structure or retainer 60 such that the buffer 62 is in a relaxed or essentially unstressed condition. Therefore, the only material force active between the casing and spike (except for the frictional force defined along the element 59) is the pneumatic pressure force operative within the chamber 65 which urges the casing downwardly relative to the spike and thereby supplements the downwardly active manual and gravitational feeding force being applied to the casing.

If the operator decreases the value of the manual contribution to the feeding force, the casing structure will tend to ride upwardly to an abnormally high position relative to the spike, as shown in FIGURE 13B (the space between the dotted lines extending across the spike stem 56 adjacent the lower end of the casing indicating the relative displacement of the spike and casing as between FIGURES 13A and 13B). As a result of such upward displacement, the buffers 63 and 64 are compressed somewhat and the annulus 66 is substantially compressed and is distorted so that it enlarges in transverse dimenion.

As a consequence, there is an increase in the value of the total force present in the chamber 65 which comprises two components; the pneumatic pressure force which has been increased in value somewhat because the free volume in the chamber has been decreased by the distortion of the annulus and downward movement of the spike head, and the resilient force developed by the annulus 66 and buffers 63 and 64 which are endeavoring to restore themselves to an unstressed condition. Such total force acts downwardly upon the casing, tending to displace it downwardly relative to the spike and thereby return these two components to a normal positional relation therebetween, which is shown in FIGURE 13A. Since, as shown in FIGURE 13B, the buffer 62 has been displaced until it is completely free from the lower end of the casing structure, any upwardly directed force that it might have been applying to the casing in the configuration illustrated in FIGURE 13A has been reduced to zero, which further contributes to the corrective positional tendency being enforced on the casing and spike.

If the tool operator applies a manual feeding force of excessive magnitude to the handles of the casing, the casing will tend to be displaced downwardly relative to the spike from the position thereof shown in FIGURE 13A to that shown in FIGURE 13C. In this event, the buffer 62 will be compressed to a considerable extent and will necessarily apply an upwardly directed force of increased value to the casing structure thereby tending to restore it to its normal position. At the same time, such abnormal downward displacement of the casing relative to the spike will increase the free volume within the chamber 65 which can be occupied by the compressed air therein, thereby tending to reduce the pressure of such air by decompression thereof so that the downwardly acting force on the casing resulting therefrom is diminished, which then effectively augments the increased force present in the buffer 62 so that the casing tends to return to the normal position thereof shown in FIGURE 13A.

The spike control system—comprising the elastomeric buffers 62, 63, 64 and 66, the pressure force developed within the chamber 65, and the frictional force developed by the friction element 59 and the diaphragm spring 60 associated therewith—establishes the positional relation of the spike and casing, and the various interrelated forces defined by such system are selected and adjusted so as to provide an optimum positional relation between the spike and casing. In this connection, the approximate midpoint between the normal low and normal high positions of the casing relative to the spike (such midpoint position being substantially depicted in FIGURE 1) is considered to define such optimum positional relation, and the selection and adjustment of the forces are made with respect thereto.

More particularly, the value of the mechanical force developed by the external buffer 62 and which tends to lift the casing relative to the spike is established by proper proportioning of such buffer so that the mechanical force exerted thereby approximately equalizes the pneumatic pressure force developed within the chamber 65 tending to move the casing downwardly relative to the spike (the pressure within such chamber during operation of the tool usually being at least equal to the line pressure and generally in excess thereof by, for example, values of from 2 to 4 p.s.i.g. with the exemplary line pressures indicated hereinbefore).

The static frictional force developed between the spike stem 56 and circumjacent friction element 59 is adjusted to a value such that it is just sufficient to prevent the spike-casing system from exhibiting relative oscillatory displacements but should not have a value any greater in magnitude than necessary to accomplish this result, for then impact energy delivered by the hammer 24 to the spike is wasted in uselessly accelerating the casing downwardly. This friction adjustment is made or determined during the few initial cycles of hammer reciprocation and prior to the spike being frictionally gripped by the work material; and once such frictional damping force is adjusted to effectuate smooth operation during these critical initial cycles, the tool then operates vibrationlessly during spike penetration of the work material. Considering the exemplary line pressures, variations in the pressure urging the hammer downwardly, and pressure in the cushion chamber 65 (all as set forth hereinbefore), it has been found that a static frictional force of approximately 50 to 60 pounds is usually sufficient in the specific tool structure illustrated and described. In theory, and sometimes in actual practice, a lesser value of this frictional force, equal to one-half of the maximum cyclic variation in the value of the pneumatic pressure force applied downwardly upon the hammer and upwardly against the casing, is adequate.

As previously explained, the diaphragm spring 60 is flexible and, in combination with the self-releasing angle of taper defined between the friction element 59 and mating surfaces of the lower casing wall 46, permits the friction element to be displaced downwardly along with the spike as it descends relative to the casing because of the receipt of impact force from the hammer during the blow-stroke thereof. Quite evidently, the friction element is relieved by such downward displacement thereof relative to the casing wall 46 of the radially oriented constraining forces otherwise applied inwardly thereagainst by such wall, and, as a result, the frictional force then existing between the friction element 59 and spike is of lesser value than otherwise. Thus, the effective dynamic frictional forces normally operative between the spike and casing are relatively low even though the static friction operative therebetween is high.

It has been found that the pressure developed within the cushion chamber may remain trapped therein for as long as several days because of the effectiveness of the buffer seals 63 and 64 and of the check valve 70, and the effectiveness of the buffer seals is augmented by protecting the sealing lips thereof from engagement with the intermediate annulus or collar 66—the ends of which may be shaped as shown best in FIGURE 15 so as to engage only the axially offset lands provided by the two buffers, as indicated hereinbefore. Also, the port 67 is preferably located so that it is not traversed by either of the buffer seals 63 and 64 since the port would tend to cut or otherwise damage the sealing lips of such buffers.

An inlet valve of modified light-weight construction is illustrated in FIGURE 16, and because the valve exteriorly is substantially identical to the inlet valve heretofore described in detail, the same reference numerals are employed to designate the respectively corresponding valve components except that for purposes of differentiation each of the numerals applied to the valve in FIGURE 16 has been primed. Accordingly, the modified inlet valve has a stem 78', a valve element 79' and a piston element 80', and for identification the hollow interior of the valve is denoted with the numeral 72a". The various structural components of the tool functionally associated with the modified inlet valve are precisely the same as heretofore described, and therefore, the identical numerals are used in conjunction therewith.

In the form shown, the inlet valve is comprised of two separate sections joined along a transverse plane extending through the valve element 79' so as to unify the two sections, as by means of the weld shown. However, any suitable fabrication technique may be employed in making the hollow inlet valve, and for example it may be cast integrally by a lost wax process or otherwise integrally produced by explosive or hydraulic cold working processes. The mass of the inlet valve is desirably minimized and for this reason it may be made of aluminum or other light weight material.

The modified inlet valve of FIGURE 16 has two features not present (at least to the same extent) in the inlet valve heretofore described in conjunction with FIGURES 1 through 13C. First, the valve in being hollow can be lighter in weight and thereby provide more rapid responses in moving between the upper and lower positions thereof in accordance with changes in the net value or resultant of the pressure forces acting thereon; and secondly, the hollow interior 72a″ thereof effectively provides an enlargement of the upper end portion of the chamber section 72a with which it is continuously in open communication and, therefore, supplements the additional volume openly connected with the chamber section 72a defined by the space 72a′ and in certain instances can totally replace such space by obviating any requirement therefor.

The modified inlet valve functions in the same manner as the valve heretofore described and, therefore, following the operational phase of the tool in which the upper end portion of the chamber section 72a (including the hollow interior 72a″ of the valve and the chamber 72a′, if used) has been exhausted to atmosphere, the pressure fluid from the passage 71 acting upwardly against the under surface of the piston element 80′ and downwardly upon the smaller-area upper surface of the valve element 79′ will cause the inlet valve to be quickly displaced upwardly to sealingly seat the valve element 79a against the valve seat 73 to terminate the delivery of pressure fluid into the main cylinder 23 beneath the hammer 24. As the pressure slowly builds up in that portion of the chamber section 72a above the piston element 80′ in accordance with the flow rate thereinto as determined by the adjustment of the needle valve 82, a pressure value is ultimately attained sufficient to cause the inlet valve to be displaced downwardly into the position shown in FIGURE 16 to open the port through the valve seat 73 and thereby re-establish communication between the flow passages 71 and 92.

It will be apparent that the upwardly facing surfaces of the inlet valve against which the pressure fluid in the chamber section 72a acts downwardly includes the inwardly extending annular surface adjacent the lower end of the piston element 80′, the inner portion of the annular surface adjacent the lower end of the valve element 79′ and the lower end closure of the stem 78′, all of which surfaces are within the hollow interior 72a″ of the valve. The operation of the inlet valve has been described in detail hereinbefore and the foregoing summary is included simply for convenience.

*Summary*

From the foregoing explanations, it is evident that the particular tool illustrated and described is a tripartite vibratile structure in which the hammer 24 is a desirably or unavoidably vibrating body, the handle-equipped casing 21 is a body in which the occurrence of vibration is undesirable, and the continuous pressure operative between the upper surface of the hammer and the opposing surface of the casing in facing relation therewith defines connecting linkage transmitting a necessary force between the vibratory hammer-body and the casing-body in which the occurrence of vibration is undesirable. Means in the form of a pressurizable enclosure defining a constant pressure space are provided for restricting the value of the force communicable through the linkage to a value having that degree of constancy in the particular structural environment which prevents the transmission of sensible vibration from the reciprocable hammer-body to the handle-equipped casing-body.

In the particular environment of the tool being considered, means are provided in the form of a friction element operative between the spike and casing to permit increased variation in the value of the continuously-operative substantially constant pressure force without the consequence of an accompanying transmission of sensible vibration from the hammer to the casing; and thus, the degree of constancy required of the force for vibrationless performance of the exemplary structure is related to an environmental factor (namely, the friction operative between the casing and spike); and clearly then, the term "substantially constant" must be construed in the context of the total environment of the tripartite vibratile structure. In the special instance of the described tool, the friction means apply constraint to the casing effectively resisting any tendency toward limited vibration thereof that might otherwise be induced because of the useful fluctuations or variations in the pressure force caused by the reciprocatory displacements of the hammer.

Operatively associated with the tool is a control system which governs the reciprocatory cycle of the hammer in response to such useful variations in the value of the force communicable through the linkage. In particular, such control system comprises a valve system responsive to variations in the value of the continuous pressure operative between the casing and hammer to govern the cyclic admission into the cylinder of compressed air charges beneath the hammer to energize the backstroke thereof, and to alternately and cyclically exhaust such compressed air charges from beneath the hammer to permit it to be propelled through its blow-stroke and into impact engagement with the work member.

The tool also includes an arrangement for automatically compensating for changes in the magnitude of the manual and gravitational feeding force applied to the tool casing to maintain the casing and spike in an optimum operational configuration. This same arrangement supplements such feeding force, which has the effect of increasing the working speed of the tool and decreasing the associated manual effort.

In this connection, the friction element together with the resilient collar or annulus mounted in the pressurizable cushion chamber which is conjointly defined by the spike and casing serve dual functions. The collar not only serves by its own distortion and compression to intensify the corrective forces developed in the cushion chamber which compensate for variations in the magnitude of the feeding force, but it also reduces the free volume within the cushion chamber and thereby enhances the over-pressure feature associated therewith by enabling the pressure therein to approximate the maximum over-pressure value. The friction element carried by the casing, in developing materially greater friction with the upwardly and materially lesser friction with the downwardly moving spike effectively de-energizes any vibratory tendency of the casing without significantly diminishing or dissipating the magnitude of the impact force being transmitted through the spike to a work material in the demolition thereof; and it additionally serves to assist proper correlation of the pneumatic and manual feeding forces and the mechanical forces resulting both from hammer-spike impact and from compression and distortion of the resilient members associated with the casing and spike to maintain the same in an optimum operating configuration.

While in the foregoing specification an embodiment of the invention has been set forth in considerable detail for purposes of making an adequate disclosure thereof, it will be apparent to those skilled in the art that numerous changes may be made in such details without departing from the spirit and principles of the invention.

What is claimed is:

1. In combination with apparatus having a vibratory element, a second element in which the occurrence of vibration is objectionable, and connecting linkage for effectuating a necessary transmission of force therebetween: means for restricting such force communicable through said linkage to a sufficiently constant value throughout each cycle of the vibratory displacement of said vibratory element to substantially prevent the transmission of sensible vibration between said elements while at the same time permitting limited variations in the value of such force in response to such vibratory displacements of said vibratory element, and means responsive to such force variations for governing the cycle of vibratory displacement of said vibratory element.

2. The combination of claim 1, in which said vibratory displacements are both linear and cyclic.

3. The combination of claim 1, in which said vibratory element is an impact-delivering element.

4. In combination, a pair of relatively reciprocable elements consisting of a cyclically vibratory element and a second element in which the occurrence of vibration is objectionable, said elements providing a pair of relatively reciprocable opposed surfaces, means defining a pressurizable enclosure and means for establishing therewithin a pressurized gaseous atmosphere including a gaseous column extending between said opposed surfaces and defining connecting linkage transmitting a pressure force between said elements, the volume of said enclosure being so related to the cyclic increases and decreases in the volume of said column produced by the cyclic reciprocations of said vibratory element that the value of the pressure within said enclosure remains sufficiently constant throughout each such cyclic reciprocation to substantially prevent the transmission of sensible vibration between said elements while also being so related to such increases and decreases in volume that the pressure varies in value between predetermined limits in response to the cyclic reciprocations of said vibratory element, and means responsive to such pressure variations for governing the cyclic reciprocations of said vibratory element.

5. In a percussive tool having a casing in which the occurrence of vibration is undesirable, a work member slidably carried by said casing for limited axial movements with respect thereto, a hammer axially reciprocable within said casing for the successive intermittent delivery of impact force to said work member, means for establishing throughout the cycle of hammer reciprocation a continuous axial force operative between said casing and hammer tending to propel the hammer in the direction toward said work member and to cause the casing to recoil in the opposite direction, means for applying to said hammer in opposition to such continuous force a cyclically varying axial force serving to energize the reciprocatory cycle of said hammer by varying in magnitude to alternately become greater than said continuous force to overcome the same and propel said hammer in the axial direction away from said work member and less than said continuous force whereby said hammer is then propelled in the axial direction toward said work member, means for restricting such continuous force to a sufficiently constant value throughout each reciprocatory cycle of said hammer to substantially prevent the transmission through such continuous force of sensible vibration from said hammer to said casing while at the same time permitting limited variations in the value of such continuous force in response to the reciprocatory displacements of said hammer, and means operative to control the aforesaid means for applying such cyclically varying axial force to said hammer and being responsive to such force variations for governing the reciprocatory cycle of said hammer.

6. The percussive tool of claim 5, in which said means for applying such cyclically varying axial force to said hammer comprises fluid pressure means.

7. The percussive tool of claim 5, in which said means for establishing such substantially continuous axial force operative upon said hammer comprises fluid pressure means.

8. In a percussive tool, a casing defining a cylinder therein, a work member axially movable with respect to said casing, a hammer axially reciprocable within said cylinder for the successive intermittent delivery of impact force to said work member, fluid pressure means for establishing a continuous force operative between said casing and hammer tending to propel the latter toward said work member, means for applying to said hammer in opposition to such continuous force a cyclically varying axial force serving to energize the reciprocatory cycle of said hammer by varing in magnitude to alternately become greater than said continuous force to overcome the same and propel said hammer in the axial direction away from said work member and less than said continuous force whereby said hammer is then propelled in the axial direction toward said work member, means for restricting such continuous force to a sufficiently constant value throughout each reciprocatory cycle of the hammer to substantially prevent the transmission of sensible vibration between said hammer and casing while at the same time permitting limited variations in the value of such continuous force in response to the reciprocatory displacements of said hammer, and means operative to control the aforesaid means for applying such cyclically varying axial force to said hammer and being responsive to such force variations for governing the reciprocatory cycle of said hammer.

9. In a pneumatic percussive tool, a casing defining a cylinder therein, a work member axially movable with respect to said casing, a hammer axially reciprocable within said cylinder for the successive intermittent delivery of impact force to said work member, said hammer and casing providing a pair of relatively reciprocable opposed surfaces, means defining a pressurizable enclosure and means for establishing therewithin a pressurized gaseous atmosphere including a gaseous column extending between said opposed surfaces and defining a continuous pressure force operative between said casing and hammer tending to propel the hammer in the direction toward said work member and to cause said casing to recoil in the opposite direction, the volume of said enclosure being so related to the cyclic increases and decreases in the volume of said column produced by the cyclic reciprocations of said hammer that the value of the pressure within said enclosure remains sufficiently constant throughout each reciprocatory cycle of said hammer to substantially prevent the transmission of sensible vibration between said hammer and casing through said column while at the same time permitting limited variations in the value of such pressure in response to the cyclic reciprocations of said hammer, means for applying to said hammer in opposition to such continuous pressure force a cyclically varying axial force serving to energize the reciprocatory cycle of said hammer by varying in magnitude to alternately become greater than said continuous pressure force to overcome the same and propel said hammer in the axial direction away from said work member and less than said continuous pressure force whereby said hammer is then propelled in the axial direction toward said work member, and means operative to control the aforesaid means for applying such cyclically varying axial force to said hammer and being responsive to such pressure variations for governing the reciprocatory cycle of said hammer.

10. The pneumatic percussive tool of claim 9, in which said means for applying such cyclically varying axial force to said hammer comprises fluid pressure means, and in which said control means includes a valve system.

11. In a pneumatic percussive tool, a casing defining a cylinder therein, a work member axially aligned with said cylinder and being axially movable with respect to said casing, a hammer axially reciprocable within said cylinder for the successive intermittent delivery of impact force to said work member, said hammer and casing providing a pair of relatively reciprocable opposed surfaces, means defining a pressurizable enclosure and means for establishing therewithin a pressurized gaseous atmosphere including a gaseous column extending between said opposed surfaces and establishing a continuous pressure force operative between said casing and hammer tending to propel the hammer in the direction toward said work member and to cause the casing to recoil in the opposite direction, the volume of said enclosure being so related to the cyclic increases and decreases in the volume of said column produced by the cyclic reciprocations of said hammer that the value of the pressure within said enclosure remains sufficiently constant throughout each such cycle to substantially prevent the transmission of sensible vibration between said hammer and casing through said column while also being so related to such increases and decreases in volume that such pressure varies in value between predetermined limits in response to the cyclic reciprocations of said hammer, and control means including a valve system responsive to such variations in pressure for cyclically admitting into said cylinder a gaseous fluid which develops a force against said hammer superior in value to said continuous force to propel said hammer in the direction away from said work member and for alternately cyclically exhausting such gaseous fluid from said cylinder whereby said hammer is then propelled toward said work member by such continuous pressure force.

12. The percussive tool of claim 11, in which said valve system includes an inlet valve selectively movable between open and closed positions and an inlet pilot valve for controlling the position of said inlet valve, said inlet pilot valve being directly responsive to the aforesaid variations in such continuous pressure.

13. The percussive tool of claim 12, in which adjustment means are provided in association with said inlet pilot valve to selectively determine the time of occurrence of the response thereof to such pressure variations to co-selectively determine the range of the reciprocatory displacements of said hammer.

14. The percussive tool of claim 12, in which adjustable means are provided in association with said inlet valve for selectively determining the period it remains in one of the alternate positions thereof for varying the frequency of the cycle of reciprocation of said hammer.

15. The percussive tool of claim 11, in which said valve system comprises both an exhaust valve and an exhaust pilot valve to control the exhausting of such gaseous fluid from said cylinder.

16. In a percussive tool, a casing defining an axially extending cylinder therein, a work member structure slidably carried by said casing for limited axial movements with respect thereto and including an upper end portion slidably engaging said cylinder, a hammer axially reciprocable within said cylinder for the successive intermittent delivery of impact force directly to such upper end of said work member structure, means for establishing throughout the cycle of hammer reciprocation a continuous axial force operative between said casing and hammer tending to propel the hammer in the direction toward said work member structure and to cause the casing to recoil in the opposite direction, means for applying to said hammer in opposition to such continuous force a cyclically varying axial force operative between such upper end of said work member structure and said hammer to energize the reciprocatory cycle of the latter by varying in magnitude to alternately become greater than said continuous force to overcome the same and propel said hammer in the axial direction away from said work member structure and less than said continuous force whereby said hammer is then propelled in the axial direction toward said work member structure, means for restricting such continuous force to a sufficiently constant valve throughout each reciprocatory cycle of said hammer to substantially prevent the transmission through such continuous force of sensible vibration from said hammer to said casing while at the same time permitting limited variations in the value of such continuous force in response to the reciprocatory displacements of said hammer, and means operative to control the aforesaid means for applying such cyclically varying axial force to said hammer and being responsive to such force variations for governing the reciprocatory cycle of said hammer.

17. In a percussive tool, a casing defining an axially extending cylinder therein, a work member structure carried by said casing for limited axial movements with respect thereto and having an upper end portion of substantially the same cross sectional area as that of said cylinder and being sealingly reciprocable therein, a hammer axially reciprocable within said cylinder for the successive intermittent delivery of impact force directly to such upper end of said work member structure, means for establishing throughout the cycle of hammer reciprocation a continuous axial force operative between said casing and hammer tending to propel the hammer in the direction toward said work member structure and to cause the casing to recoil in the opposite direction, means for supplying fluid charges to said cylinder intermediate said hammer and such upper end of said work member structure to energize the reciprocatory motion of said hammer by providing an axial force operative thereagainst in opposition to and of greater magnitude than such continuous force to overcome the same and propel said hammer in the axial direction away from said work member structure and for alternately exhausting such charges from said cylinder and thereby enabling said hammer to be propelled by such continuous force in the axial direction toward said work member structure, means for restricting such continuous force to a sufficiently constant value throughout each reciprocatory cycle of said hammer to substantially prevent the transmission through such continuous force of sensible vibration from said hammer to said casing while at the same time permitting limited variations in the value of such continuous force in response to the reciprocatory displacements of said hammer, and means operative to control the aforesaid means for supplying fluid charges to said cylinder and for exhausting such charges therefrom in response to such force variations to govern the reciprocatory cycle of said hammer.

18. In a percussive tool, a casing defining an axially extending cylinder therein, a work members structure carried by said casing for limited axial movements with respect thereto and having an upper end portion of substantially the same cross sectional area as that of said cylinder and being sealingly reciprocable therein, a hammer axially reciprocable within said cylinder for the successive intermittent delivery of impact force directly to such upper end of said work member structure, said hammer and casing providing a pair of relatively reciprocable opposed surfaces, means defining a pressurizable enclosure and means for establishing therewithin a pressurized gaseous atmosphere including a gaseous column extending between said opposed surfaces and defining a continuous pressure force operative between said casing and hammer tending to propel the hammer in the direction toward said work member structure and to cause said casing to recoil in the opposite direction, the volume of said enclosure being so related to the cyclic increases and decreases in the volume of said column produced by the cyclic reciprocations of said hammer that the value of the pressure within said enclosure remains sufficiently constant throughout each reciprocatory cycle of said hammer to substantially prevent the transmission through said column of sensible vibration between said hammer and casing while at the same time permitting limited variations in the value of such pressure in response to the cyclic reciprocations of said hammer, means for supplying fluid charges to said cylinder intermediate said hammer and such upper end of said work member structure to energize the reciprocatory cycle of said hammer by providing an axial force operative thereagainst in opposition to and of greater magnitude than such continuous pressure force to overcome the same and propel said hammer in the axial direction away from said work member structure and for alternately exhausting such charges from said cylinder and thereby enabling said hammer to be propelled by such continuous pressure force in the axial direction toward said work member structure, and means operative to control the aforesaid means for supplying fluid charges to said cylinder and for exhausting such charges therefrom in response to such pressure variations to govern the reciprocatory cycle of said hammer.

19. The percussive tool of claim 18, in which said work member structure is a unitary component from such upper end portion to the material-engaging work point thereof.

20. The percussive tool of claim 18, in which said control means comprises a valve system including an inlet valve selectively movable between open and closed positions and an inlet pivot valve for determining such selective motion thereof, said inlet pilot valve being directly responsive to the aforesaid variations in such continuous pressure.

21. The percussive tool of claim 20, in which adjustment means are provided in association with said inlet pilot valve to selectively determine the time of occurrence of the response thereof to such pressure variations to co-selectively determine the range of the reciprocatory displacements of said hammer.

22. The percussive tool of claim 20, in which adjustable means are provided in association with said inlet valve for selective determining the period it remains in one of the alternate positions thereof for varying the frequency of the cycle of reciprocation of said hammer.

23. The percussive tool of claim 20, in which said valve system comprises both an exhaust valve and an exhaust pilot valve to control the exhausting of such fluid charges from said cylinder.

24. In combination with apparatus having a vibratory element, a second element in which the occurrence of vibration is objectionable, and connecting linkage for effectuating a necessary transmission of force therebetween: means for confining variation in the value of such transmitted force within a preselected limited range and means for developing a force of correspondingly preselected value opposing and sufficient to substantially suppress sensible vibratory displacements of said second element tending to be enforced thereon in consequence of such limited variations in the value of such transmitted force.

25. In combination, a pair of relatively reciprocable elements consisting of a cyclically vibratory element and a second element in which the occurrence of vibration is objectionable, said elements providing a pair of relatively reciprocable opposed surfaces, means defining a pressurizable enclosure and means for establishing therewithin a pressurized gaseous atmosphere including a gaseous column extending between said opposed surfaces and defining connecting linkage transmitting a pressure force between said elements, the volume of said enclosure being so related to the cyclic increases and decreases in the volume of said column produced by the cyclic reciprocations of said vibratory element that variation in the value of the pressure within said enclosure and therefore in the pressure force transmitted through said column are confined within respective preselected limited ranges throughout each such cycle, and means for developing a force of correspondingly preselected value opposing and sufficient to substantially suppress sensible vibratory displacements of said second element tending to be enforced thereon in consequence of such limited variation in the value of such pressure force.

26. In a percussive tool having a casing in which the occurrence of vibration is undesirable, a work member carried by said casing for limited axial movements with respect thereto, a hammer axially reciprocable within said casing for the successive intermittent delivery of impact force to said work member, means for establishing throughout the cycle of hammer reciprocation a continuous axial force operative between said casing and hammer tending to propel the hammer in the direction toward said work member and to cause the casing to recoil in the opposite direction, means for applying to said hammer in opposition to such continuous force a cyclically varying axial force serving to energize the reciprocatory cycle of said hammer by varying in magnitude to alternately become greater than said continuous force to overcome the same and propel said hammer in the axial direction away from said work member and less than said continuous force whereby said hammer is then propelled in the axial direction toward said work member, means for confining variation in the value of such continuous force within a preselected limited range throughout each cycle of the vibratory displacement of said hammer, and means for developing a force of correspondingly preselected value opposing and sufficient to substantially suppress sensible vibratory displacements of said second element tending to be enforced thereon in consequence of such limited variation in the value of such continuous force.

27. In a pneumatic percussive tool, a casing defining a cylinder therein, a work member axially movable with respect to said casing, a hammer axially reciprocable within said cylinder for the successive intermittent delivery of impact force to said work member, said hammer and casing providing a pair of relatively reciprocable opposed surfaces, means defining a pressurizable enclosure and means for establishing therewithin a pressurized gaseous atmosphere including a gaseous column extending between said opposed surfaces and defining a continuous pressure force operative between said casing and hammer tending to propel the hammer in the direction toward said work member and to cause said casing to recoil in the opposite direction, means for applying to said hammer in opposition to such continuous force a cyclically varying axial force serving to energize the reciprocatory cycle of said hammer by varying in magnitude to alternately become greater than said continuous force to overcome the same and propel said hammer in the axial direction away from said work member and less than said continuous force whereby said hammer is then propelled in the axial direction toward said work member, the volume of said enclosure being so related to the cyclic increases and decreases in the volume of said column produced by the cyclic reciprocations of said hammer that variation in the value of the pressure within said enclosure and therefore in the pressure force transmitted through said columns are confined within respective preselected limited ranges throughout each such cycle, and means for developing a force of correspondingly preselected value opposing and sufficient to substantially suppress sensible vibratory displacements of said casing tending to be enforced thereon in consequence of such limited variations in the value of such pressure force.

28. The percussive tool of claim 27, in which said last-mentioned force-developing means comprises structure cooperatively relating said casing to said work member.

29. The percussive tool of claim 28, in which said structure includes a friction element establishing a frictional force substantially continuously operative between said casing and work member.

30. The percussive tool of claim 29, in which said friction element is carried by said casing and is positively constrained against axial displacements in one direction with respect thereto.

31. In combination with apparatus having a first element adapted to exhibit vibratory motion, a second element in which the occurrence of vibration is objectionable, and connecting linkage for effectuating a necessary transmission of force therebetween: means for restricting permitted variations in the value of such transmitted force resulting from such vibratory motion to a preselected limited range throughout each cycle of such vibratory motion, means for developing a force of correspondingly preselected value effective to inhibit vibratory movements of said second element sufficiently to substantially suppress sensible vibrations thereof tending to be enforced thereon in consequence of such permitted limited variations in the value of such transmitted force, and means responsive to the variations in value of such transmitted force for governing the vibratory motion of said vibratory element.

32. In combination, a pair of relatively reciprocable elements consisting of a first element adapted to exhibit cyclically vibratory motion and a second element in which the occurrence of vibration is objectionable, said elements providing a pair of relatively reciprocable opposed surfaces, means defining a pressurizable enclosure and means for establishing therewithin a pressurized gaseous atmosphere including a gaseous column extending between said opposed surfaces and defining connecting linkage transmitting a pressure force between said elements, the volume of said enclosure being so related to the cyclic increases and decreases in the volume of said column produced by the cyclic reciprocations of said vibratory element that permitted variations in the values of the pressure within said enclosure and therefore of such pressure force transmitted through said column are restricted to respectively preselected limited ranges throughout each such cycle, means for developing a force of correspondingly preselected value effective to inhibit vibratory displacements of said second element sufficiently to substantially suppress sensible vibrations thereof tending to be enforced thereon in consequence of any such permitted limited variations, and means responsive to such limited variations in the value of such pressure for governing the cyclic reciprocations of said vibratory element.

33. In a percussive tool having a casing in which the occurrence of vibration is undesirable, a work member carried by said casing for limited axial movements with respect thereto, a hammer axially reciprocable within said casing for the successive intermittent delivery of impact force to said work member, means for establishing throughout the cycle of hammer reciprocation a continuous axial force operative between said casing and hammer tending to propel the hammer in the direction toward said work member and to cause the casing to recoil in the opposite direction, means for applying to said hammer in opposition to such continuous force a cyclically varying axial force serving to energize the reciprocatory cycle of said hammer by varying in magnitude to alternately become greater than said continuous force to overcome the same and propel said hammer in the axial direction away from said work member and less than said continuous force whereby said hammer is then propelled in the axial direction toward said work member, means for restricting permitted variations in the value of such continuous force resulting from the reciprocatory motion of said hammer to a preselected limited range throughout each such cycle of reciprocation thereof, means for developing a force of correspondingly preselected value effective to inhibit vibratory movements of said casing sufficiently to substantially suppress sensible vibrations thereof tending to be enforced thereon in consequence of such permitted limited variations in the value of such continuous force, and means operative to control the aforesaid means for applying such cyclically varying axial force to said hammer and being responsive to the variations in value of such continuous force for governing the reciprocatory cycle of said hammer.

34. In a pneumatic percussive tool, a casing defining a cylinder therein, a work member axially movable with respect to said casing, a hammer axially reciprocable within said cylinder for the successive intermittent delivery of impact force to said work member, said hammer and casing providing a pair of relatively reciprocable opposed surfaces, means defining a pressurizable enclosure and means for establishing therewithin a pressurized gaseous atmosphere including a gaseous column extending between said opposed surfaces and defining a continuous pressure force operative between said casing and hammer tending to propel the hammer in the direction toward said work member and to cause said casing to recoil in the opposite direction, means for applying to said hammer in opposition to such continuous force a cyclically varying axial force serving to energize the reciprocatory cycle of said hammer by varying in magnitude to alternately become greater than said continuous force to overcome the same and propel said hammer in the axial direction away from said work member and less than said continuous force whereby said hammer is then propelled in the axial direction toward said work member, the volume of said enclosure being so related to the cyclic increases and decreases in the volume of said column produced by the cyclic reciprocations of said hammer that permitted variations in the values of the pressure within said enclosure and therefore of such pressure force transmitted through said column are restricted to respectively preselected limited ranges throughout each such cycle, means for developing a force of correspondingly preselected value effective to inhibit vibratory movements of said casing sufficiently to substantially suppress sensible vibrations thereof tending to be enforced thereon in consequence of such permitted limited variations in the value of such continuous pressure force, and means operative to control the aforesaid means for applying such cyclically varying axial force to said hammer and being responsive to the variations in value of such continuous pressure force for governing the reciprocatory cycle of said hammer.

35. The percussive tool of claim 34, in which said work member has an upper end portion of substantially the same cross sectional area as that of said cylinder and is sealingly reciprocable therein, said cyclically varying axial force being a gaseous pressure force operative between said hammer and such upper end of said work member.

36. The percussive tool of claim 35, in which the aforesaid means for developing said inhibiting force comprises structure cooperatively relating said casing to said work member.

37. The percussive tool of claim 36, in which said structure includes a friction element establishing a frictional force substantially continuously operative between said casing and work member.

38. The percussive tool of claim 37, in which said friction element is carried by said casing and is constrained against axial displacements in at least one direction with respect thereto.

39. The percussive tool of claim 35, in which said control means includes a valve system for cyclically admitting gaseous fluid into said cylinder and for alternately cyclically exhausting such gaseous pressure fluid therefrom to establish such cyclically varying axial pressure force between said hammer and the upper end of said work member.

40. The percussive tool of claim 39, in which said valve system includes an inlet valve selectively movable between open and closed positions and an inlet pilot valve for controlling the position of said inlet valve, said inlet pilot valve being directly responsive to the aforesaid variations in the pressure of the atmosphere within said enclosure.

41. The percussive tool of claim 40, in which adjustment means are provided in association with said inlet pilot valve to selectively determine the time of occurrence of the response thereof to such pressure variations to co-selectively determine the range of the reciprocatory displacements of said hammer.

42. The percussive tool of claim 40, in which adjustable means are provided in association with said inlet valve for selectively determining the period it remains in one of the alternate positions thereof for varying the frequency of the cycle of reciprocation of said hammer.

43. The percussive tool of claim 39, in which said valve system comprises both an exhaust valve and an exhaust pilot valve to control the exhausting of such gaseous fluid from said cylinder.

44. The percussive tool of claim 43, in which said means for pressurizing said cushion chamber includes a passage means equipped therealong with a uni-directional flow valve operative to permit the flow of pressure fluid therepast into said cushion chamber, and flow conduit means adapted to abruptly terminate the flow of pressure fluid therethrough, said flow conduit means being in open communication with said passage means whereby the development in said flow conduit means of an increase in the density of a pressure fluid as a consequence of of any such termination in the flow thereof results in the transient presence of an over-pressure at said uni-directional valve and an accompanying over-pressurization of said cushion chamber.

45. The percussive tool of claim 44, in which said resilient means comprises an annulus mounted within said cushion chamber and reducing the free volume thereof.

46. The percussive tool of claim 45, and further including friction means operative between said casing and work member structure for providing a substantially continuously operative friction force therebetween.

47. In a percussive tool, a casing having an axially extending cylinder therein, a work member structure supported by said casing for limited axial movements with respect thereto and having an upper end portion sealingly reciprocable within said cylinder adjacent an end portion thereof, a hammer within said cylinder and means for cyclically reciprocating said hammer therein for the successive intermittent delivery of impact force to said work member, said cylinder providing adjacent such end thereof a pressurizable cushion chamber circumjacent a portion of said work member structure and defined between a pair of opposed surfaces respectively provided by said casing and work member structure, means for pressurizing said cushion chamber to develop therewithin an axially oriented pressure force substantially continuously operative between said opposed surfaces to apply a feeding force to said casing urging the same in the axial direction of the blow stroke of said hammer, and resilient means selectively active between said casing and work member structure for developing therebetween an axial force tending in conjunction with such pressure force to maintain said casing and work member structure in an optimum operational positional relation.

48. The percussive tool of claim 47, in which said resilient means comprises an annulus mounted within said cushion chamber.

49. The percussive tool of claim 47, and further including friction means operative between said casing and work member structure for providing a substantially continuously operative friction force therebetween.

50. In a pneumatic percussive tool, a handle-equipped casing defining an axially extending cylinder therein, a work member structure related to said casing for limited axial movements with respect thereto and having an upper end portion of substantially the same cross sectional area as that of said cylinder and being sealingly reciprocable therein, a hammer reciprocable within said cylinder for the successive intermittent delivery of impact force to said work member structure, said cylinder being provided with a flow port adjacent such upper end of said work member structure through which compressed air charges are alternately admitted and exhausted into and from said cylinder for energizing the reciprocatory cycle of said hammer, means for establishing within said cylinder a continuous pressure force operative between said casing and hammer tending to propel the latter in a direction toward impact with said work member structure, friction means substantially continuously operative between said work member structure and casing for inhibiting vibratory displacements of said casing tending to be enforced thereon as a consequence of variations within a limited range of magnitudes transmitted thereto through such continuous pressure force, means for restricting the value of such continuous pressure force throughout each cycle of reciprocation of said hammer to a sufficiently constant value within such range that the transmission of sensible vibration from said hammer to said casing is prevented but at the same time permitting variations within such range in the value of such continuous pressure force in response to the cyclic reciprocations of said hammer, and a control valve system responsive to such variations in the pressure force for cyclically admitting compressed air through said port and into said cylinder for developing an axial force against said hammer superior in value to said continuous pressure force to propel the hammer in the direction away from said work member structure and for alternately and cyclically exhausting such compressed air through said port whereby said hammer is propelled toward said work member structure by such continuous pressure force.

51. The percussive tool of claim 50, in which said cylinder defines a cushion chamber circumjacent said work member structure beneath such upper end portion thereof, in which means are provided for pressurizing said cushion chamber to provide a feeding force therein axially operative between said work member structure and casing, and in which resilient means are provided for developing mechanical force between said casing and work member structure selectively superior in one axial direction or the other and tending with such feeding force to maintain the relative position of said casing and work member structure in an optimum operational relation.

52. The percussive tool of claim 51, in which said valve system includes an inlet valve selectively movable between open and closed positions and an inlet pilot valve for controlling the position of said inlet valve, said inlet pilot valve being responsive to the aforesaid variations in the value of such continuous pressure force, and also includes an exhaust valve and exhaust pilot valve operative in association with said port to control the exhausting of compressed air therethrough from said cylinder.

53. The percussive tool of claim 52, in which a plurality of adjustable means are provided, one for selectively determining the minimum pressure establishing the aforesaid continuous pressure force, another for selectively determining the rate of response of said inlet pilot valve to such variations in the value of such continuous pressure force to establish the range of the reciprocatory displacements of said hammer, and still another for selectively determining the period through which said inlet valve remains in one of the alternate positions thereof for adjusting the frequency of the cycle of reciprocation of said hammer.

54. The percussive tool of claim 53, in which said means for pressurizing said cushion chamber comprises a passage communicating with said inlet valve adjacent the upstream side thereof and being provided with a uni-directional valve therealong for admitting compressed air to said cushion chamber, the abrupt termination of the flow of compressed air past said inlet valve causing inertial development of an increase in unit mass in the pressure fluid resulting in the transient presence of an over-pressure at said uni-directional valve and an accompanying over-pressurization of said cushion chamber.

References Cited by the Examiner

UNITED STATES PATENTS

| | | | |
|---|---|---|---|
| 2,679,826 | 6/1954 | Leavell | 173—139 |
| 2,693,733 | 11/1954 | Fish | 173—135 |
| 3,003,773 | 10/1961 | Fuehrer | 173—139 |
| 3,028,841 | 3/1962 | Leavell | 173—135 |
| 3,060,894 | 10/1962 | Dean et al. | 173—135 |
| 3,193,026 | 7/1965 | Kupka | 173—138 |

MILTON KAUFMAN, *Primary Examiner.*

L. P. KESSLER, *Examiner.*